(12) United States Patent
Rowan et al.

(10) Patent No.: US 10,125,222 B2
(45) Date of Patent: Nov. 13, 2018

(54) METHOD FOR THE PREPARATION OF HIGH MOLECULAR WEIGHT OLIGO(ALKYLENE GLYCOL) FUNCTIONALIZED POLYISOCYANOPEPTIDES

(71) Applicant: Stichting Katholieke Universiteit Meer in Het Bijzonder Radboud Universiteit Nijmegen, Nijmegen (NL)

(72) Inventors: Alan Edward Rowan, Nijmegen (NL); Roeland Johannes Maria Nolte, Nijmegen (NL); Jeroen Johannes Lambertus Maria Cornelissen, Enschede (NL); Heather Joy Kitto, Minto (AU); Erik Schwartz, Nijmegen (NL); Matthieu Koepf, Brachenbronn-Birlenbach (FR)

(73) Assignee: STICHTING KATHOLIEKE UNIVERSITEIT MEER IN HET BIJZONDER RADBOUD UNIVERSITEIT NIJMEGEN, Nijmegen (NL)

( * ) Notice: Subject to any disclaimer, the term of this patent is extended or adjusted under 35 U.S.C. 154(b) by 0 days.

(21) Appl. No.: 15/373,424

(22) Filed: Dec. 8, 2016

(65) Prior Publication Data

US 2017/0088670 A1    Mar. 30, 2017

Related U.S. Application Data

(63) Continuation of application No. 14/577,038, filed on Dec. 19, 2014, now abandoned, which is a
(Continued)

(30) Foreign Application Priority Data

Jul. 16, 2009   (EP) .................................... 09165705

(51) Int. Cl.
   *C08G 18/08*   (2006.01)
   *C08G 69/40*   (2006.01)
(Continued)

(52) U.S. Cl.
   CPC .............. *C08G 69/40* (2013.01); *C08L 77/04* (2013.01); *C09D 177/04* (2013.01); *C08L 2201/54* (2013.01)

(58) Field of Classification Search
   CPC ..... C08G 69/40; C08L 77/04; C08L 2201/54; C09D 177/04
   (Continued)

(56) References Cited

U.S. PATENT DOCUMENTS

| 8,981,001 B2 | 3/2015 | Rowan et al. |
| 2012/0149836 A1 | 6/2012 | Rowan et al. |
| 2015/0105516 A1 | 4/2015 | Rowan et al. |

FOREIGN PATENT DOCUMENTS

| WO | 2011/007012 A9 | 1/2011 |

OTHER PUBLICATIONS

"β-Helical Polymers from Isocyanopeptides", Cornelissen, et.al., Science, vo.293, p. 676-680, Jul. 27, 2001 (Year: 2001).*
(Continued)

*Primary Examiner* — Aiqun Li
(74) *Attorney, Agent, or Firm* — TraskBritt, P.C.

(57) ABSTRACT

The present invention relates to a process for the preparation of oligo(alkylene glycol)-functionalized polyisocyanopeptides comprising the steps of functionalizing an isocyanopeptide with oligo-(alkylene glycol) side chains and subsequently polymerizing the oligo-alkylene glycol-functionalized isocyanopeptides. Several isocyanopeptides may be functionalized with various linear or non-linear oligo-(alkylene glycol) side chains having variable chain length. The alkylene glycol may be selected from the group consisting of ethylene-, propylene-, butylene- or pentylene glycol. Preferably, the isocyanopeptides are functionalized with at least three ethylene glycol side chains. The peptides may comprise L-amino acids, D-amino acids or D, L-amino acids. The obtained oligoalkylene-functionalized polyisocyanopeptides are a new class of materials with unique thermo-responsive properties.

8 Claims, 10 Drawing Sheets

Related U.S. Application Data continuation of application No. 13/384,091, filed as application No. PCT/EP2010/060373 on Jul. 16, 2010, now Pat. No. 8,981,001.

(51) Int. Cl.
*C09D 177/04* (2006.01)
*C08L 77/04* (2006.01)

(58) Field of Classification Search
USPC .......................................................... 524/591
See application file for complete search history.

(56) References Cited

OTHER PUBLICATIONS

Kitto et al., Post-modification of helical dipeptodo polyisocyanides using the "click" reaction, Journal of Materials Chemistry 2008, pp. 5615-5624, vol. 18, No. 46, Royal Society of Chemistry, Thomas Graham house, Science Park, GB.

Roks et al., Biomimetic macromolecular chemistry: design and synthesis of an artificial ion channel based on a polymer containing cofacially stacked crown ether rings. Incorporation in dihexadecyl phosphate vesicles and study of cobalt ion transport, Macromolecules, 1992, pp. 5398-5407, vol. 25. No. 20.

PCT International Search Report and Written Opinion, PCT/EP2010/060373, dated Nov. 3, 2010.

International Preliminary Report on Patentability PCT/EP2010/060373 dated Jan. 17, 2012.

Schwartz, et al. Synthesis, characterization and chiroptical properties of 'click'able polyisocyanopeptides; Journal of Materials Chemistry; 2007, 17, 1876-1884.

Gardel, M., Synthetic polymers with biological rigidity, News and Views, Nature 11855, 2013, pp. 1-2.

Kouwer et al., Responsive biomimetic networks from polyisocyanopeptide hydrogels, Letter, Nature 11839, vol. 000, 2013, pp. 1-5.

\* cited by examiner

METHOD FOR THE PREPARATION OF HIGH MOLECULAR WEIGHT OLIGO(ALKYLENE GLYCOL) FUNCTIONALIZED POLYISOCYANOPEPTIDES

CROSS-REFERENCE TO RELATED APPLICATIONS

This application is a continuation of U.S. patent application Ser. No. 14/577,038, filed Dec. 19, 2014, now abandoned, which is a continuation of U.S. patent application Ser. No. 13/384,091, filed Feb. 27, 2012, now U.S. Pat. No. 8,981,001, issued Mar. 17, 2015, which application is a national phase entry under 35 U.S.C. § 371 of International Patent Application PCT/EP2010/060373, filed Jul. 16, 2010, designating the United States of America and published in English as International Patent Publication WO 2011/007012 A9 on Jan. 20, 2011, which claims the benefit under Article 8 of the Patent Cooperation Treaty and under 35 U.S.C. § 119(e) to European Patent Application Serial No. 09165705.6, filed Jul. 16, 2009, the disclosure of each of which is hereby incorporated herein in its entirety by this reference.

TECHNICAL FIELD

This disclosure relates to a method for the preparation of oligo(alkylene glycol)-functionalized polyisocyanopeptides. The disclosure further relates to oligo(alkylene glycol)-functionalized poly(isocyanopeptides). The disclosure also relates to hydrogels or coatings comprising the oligo(alkylene glycol)-functionalized poly(isocyanopeptides) according to the disclosure.

BACKGROUND

The preparation of ethylene glycol-functionalized polycarboxyphenylisocyanides via peptide bound formation has been described by Y. Hase, Y. Mitsutsuji, M. Ishikawa, K. Maeda, K. Okoshi, and E. Yashima, *Chem.-Asian J.* 2007, 2:755-763. This publication discloses the post-functionalization of water-soluble poly(carboxyphenylisocyanide) according to Formula 1 in dimethyl sulfoxide via a classical peptide coupling strategy. In this case, the materials used were preformed polymers ($M_n$=3.3×10$^4$ g/mol, $M_n/M_w$=3.2) that were modified after completion of polymerization with different side chains, including cyclic and linear ethylene glycol substituents.

This method does not lead to quantitative grafting of the substituents. Several treatments with the desired amino (ethylene glycol) derivative had to be conducted on the starting materials to lead to an acceptable grafting density of ethylene glycol chains onto the polymer backbone.

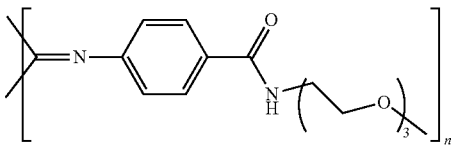

Formula 1

Another disclosure of an oligo(ethylene glycol)-functionalized poly (isocyanopeptide) has been published by H. J. Kitto et al., *J. Mater. Chem.* 2008, 18:5615-5624.

The oligo(ethylene glycol)-functionalized poly(isocyanodipeptide), according to formula 2, was prepared via a post-modification or grafting of ethylene glycol chains making use of a copper(I) catalyzed [2+3] Huisgen dipolar cycloaddition between acetylenes and azides. Acetylene-functionalized poly(isocyanodipeptide)s were first prepared and further modified by 13-azido-2,5,8,11-tetraoxatridecane, resulting in hydrophilic to fully water-soluble materials, depending on the ratio of ethylene glycol chains grafted onto the backbone of the polymer.

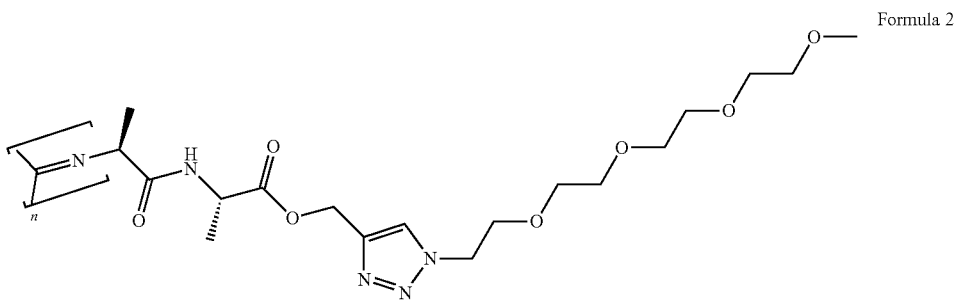

Formula 2

This method, however, suffers from several drawbacks with regard to the preparation of biocompatible high molecular weight materials. Due to the inherent low solubility of the starting material (fully acetylene-substituted polymers) and its high tendency to aggregate, polymers with a limited degree of polymerization ([DP] <1200) and a specific type of chirality (LL or DD enantiomers of the dialanine fragments) could be efficiently processed and functionalized.

Like any other type of post-modification strategy, this method inherently leads to polymers more prone to structural defects. For instance, structural defects can be non-reacted acetylene groups within the prepared materials. These might lead to uncontrollable side reactions during further processing of the material, which is undesired.

A still further disadvantage is that the complete removal of copper salts, required for the described click strategy, is difficult due to the complexation ability of oligo(ethylene glycol)s toward cationic species. The removal of copper salts is a prerequisite for any biological application of the material, especially considering the stoichiometric amount of copper used to promote an efficient grafting reaction in the described procedure. This method is, therefore, less suited if the poly(isocyanopeptide)s are to be used in a biological application.

Moreover, the dipolar cycloaddition of alkynes and azides inherently leads to the formation of triazole fragments. In the case of the described polymer post-modification strategy, it results in the introduction of a high density of triazole units onto the polymer backbone that further hinder the complete removal of copper salts from the materials. Indeed, polytriazoles are known to coordinate transition metals cations and are specifically used as ligands for copper.

Moreover, triazoles are prone to ionization under physiological conditions, which can lead to unwanted ionized species such as polyelectrolytes.

BRIEF SUMMARY

The object of this disclosure is to overcome at least one of the above-mentioned drawbacks and to provide a new method to prepare homogenous high molecular weight poly [(alkylene glycol) isocyanopeptides], which may be further functionalized.

The object of the disclosure is achieved in that a method is provided comprising the steps of first functionalizing isocyanopeptides with oligo(alkylene glycol) side chains and subsequently polymerizing the oligo(alkylene glycol)-functionalized isocyanopeptides.

The polymerization of oligoethylene isocyanide monomers has been unsuccessful up until now due to complexation of the nickel catalysts to the monomers and subsequent catalytic inactivation. The methods according to the disclosure now for the first time allow the preparation of fully substituted polymers. For instance, it is shown herein that the use of dipeptidoisocyanides functionalized with oligoethylene units in organic solvents (not water) and nickel(II) catalysts resulted in well-defined polymers with high molecular weights.

Surprisingly, it has been found that the method for the preparation of the oligo(alkylene glycol)-functionalized poly(isocyanopeptide)s as disclosed herein results in oligo (alkylene glycol)-functionalized poly(isocyanopeptide)s with advantageous properties.

Advantageous oligo-ethylene glycol units are depicted below. In general, the term oligo refers to a number less than 10.

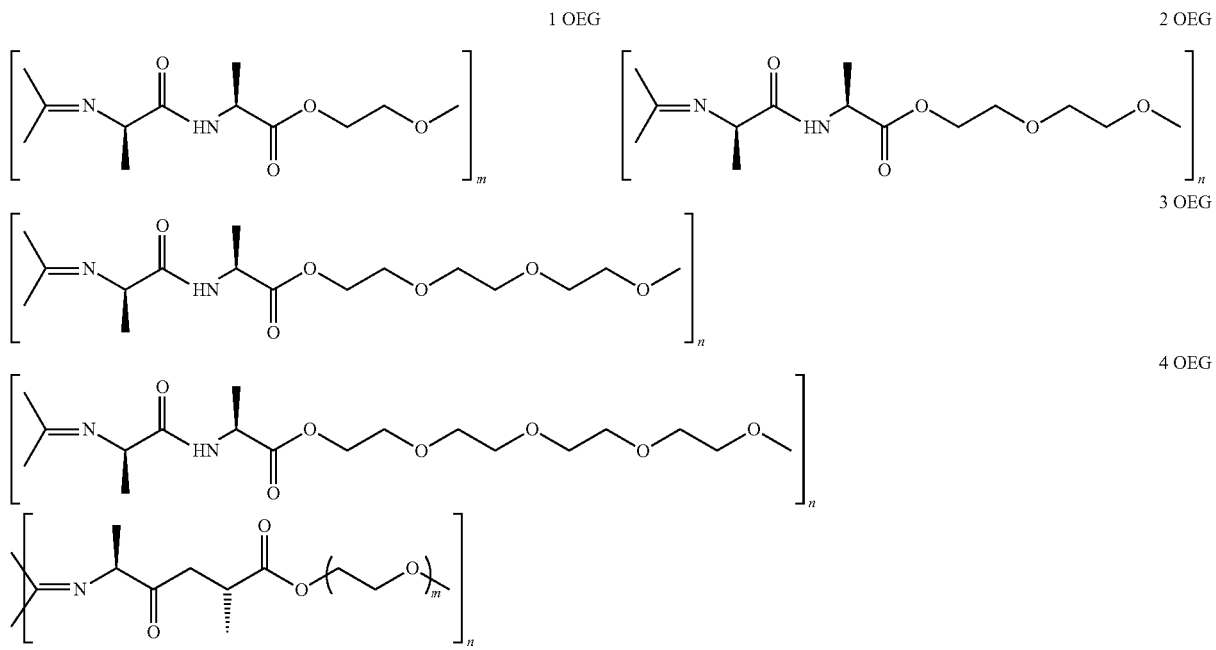

The above formula represents the resultant oligo-ethylene glycol (OEG)-appended polyisocyanopeptides wherein the number of ethylene glycol units may be 1-10. Polymers can be prepared with OEG side arms of n=1-100,000.

The polymers resulting from the method according to the invention exhibit a well-defined structure, such as a perfect oligo(alkylene glycol) coated beta-sheet helical structure, according to FIG. 1. This structure comprises a helical poly(imine) core in which virtually each nitrogen is substituted with a peptidic pendant. Due to the pseudo $4_1$ helical symmetry of the poly(imine) backbone, every pendant grafted onto the $n^{th}$ nitrogen is involved in an intramolecular beta-sheet like packing with the corresponding pendant grafted onto the n+$4^{th}$ position. The peptidic segments are further decorated with oligo(alkylene glycol) substituents that form the outer shell of the structure. The water solubility of the resulting materials is directly related to the choice of adequate oligo(ethylene glycol) substituents. Finally, the helical sense of the polymer chain is dictated by the chirality of amino acids connected to the imine groups.

The method according to the disclosure leads to minimal or no structural defects in the polymers obtained. The term "minimal" is to be interpreted as that more than 96% of the correct side chains are correctly attached to the polymer backbone, such as 97%, 98%, 99%, 99.5% or even 100%.

In other words, due to the direct polymerization of functionalized monomers, occurrence of structural defects regarding the grafting density of the side chains is minimal in the resulting materials and nearly all, if not all, of the monomeric units bear a defined substituent that can be similar to the others (homopolymers) or statistically related to the initial mixture of monomers (co-polymers).

The method according to the disclosure concerns the controlled preparation of homogeneous, stable, water-soluble helical polymers of a high degree of polymerization [DP]>1500 and high persistence length.

The oligo(alkylene glycol)-functionalized poly(isocyanopeptide)s according to the disclosure, therefore, have unique thermo-reversible properties. Major characteristics of the polymers according to the disclosure are the combination of the characteristics of a poly(isocyanopeptide)s such as optical activity, highly defined macromolecular architecture, high persistence length and robustness, with the versatility of their thermally induced self-assembly in water, the ability to prepare functional copolymers and the fully biocompatible nature of the polymers.

The disclosure also goes against a prejudice in the art. An efficient polymerization of oligo(ethylene glycol) containing monomers was not to be expected. Roks et al. (*Macromolecules* 1992, 25:5398-5407) discloses the preparation of cyclic ethylene glycol grafted poly(phenylisocyanide)s, according to formula 3. The cyclic ethylene glycol substituted monomers, containing from four up to seven ethylene glycol units, were difficult to polymerize efficiently. The polymerization required the treating of neat monomers by nickel salts at 60° C. over 3 days, leading non-quantitatively to materials presenting a low degree of polymerization ([DP]<65). These polymeric compounds showed an enhanced affinity toward metallic cations. Coordination between the pendant crown ethers and the catalyst within the growing oligomers may explain the low monomer conversion and limited degree of polymerization of the resulting materials.

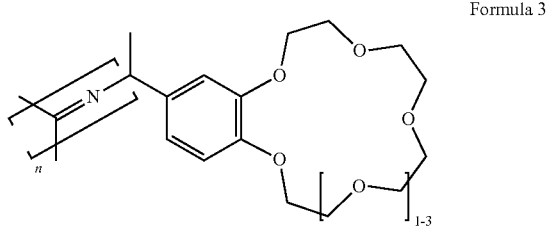

Formula 3

It was, therefore, to be expected that the presence of numerous linear oligo(ethylene glycol) side chains in the process of the disclosure would result in a similar effect, preventing the efficient polymerization of isocyanopeptides containing oligo(ethylene glycol) units.

Surprisingly, it has, however, been found that an efficient polymerization of (alkylene glycol) substituted isocyanopeptides can be achieved in the process of the disclosure.

In the method disclosed herein, the monomers are derived from adequate oligo(alkylene glycol) fragments. A multi-steps peptidic coupling strategy is used to successively introduce the desired amino acids. Following the introduction of the desired peptidic sequence, the compounds are formylated and subsequently dehydrated to give the desired oligo(alkylene glycol)isocyanopeptide, which is then polymerized according to the method herein described.

The monomers are preferably composed of a di-, tri-, tetra- or more peptidic motif substituted at the C-terminal with the desired oligo(alkylene glycol) chains. The chains may be linear, branched, or dendronized oligo(alkylene oxide) based. Preferably, the chain is linear and composed of ethylene glycol. The peptidic segment can be of different compositions determined by the sequence of natural or non-natural and expended amino acids or mixture thereof.

Preferably, the isocyanopeptides are functionalized with at least three ethylene glycol units to lead to water-soluble materials after polymerization. According to the number of ethylene glycol units and to the terminal substituents of the (alkylene glycol) side chains, the general physical properties of the resulting materials can be systematically varied.

In a representative example, a millimolar solution of monomer in a non-polar organic solvent or mixture of solvents was added to a Nickel (II) catalyst dissolved in a polar solvent in a ratio of 1:50 up to 1:100,000 catalyst to monomer. In a sealed environment, the mixture was vigorously stirred for 2 to 24 hours. Once completed, the reaction mixture was evaporated and the crude product dissolved in organic solvents and precipitated in diethylether or similar non-compatible organic solvents giving the desired product.

Suitable catalysts may be selected from the group consisting of nickel chloride; nickel perchlorate, nickel tetra tert-butyl isocyanide and others.

Examples of suitable alkylene glycols are ethylene-, propylene-, butylene- or pentylene glycol. Preferably, the alkylene glycol is ethylene glycol. These chains are preferably terminated with only one free hydroxy or free amine end group to permit the direct coupling to a desired amino acid with an appropriate coupling strategy. Examples of coupling protocols for alcohol derivatives are given herein.

Examples of amino acids that advantageously may be used in the present invention are N-protected alanine, arginine, asparagines, aspartic acid, cysteine, glutamic acid, glutamine, glycine, histidine, isoleucine, leucine, lysine, methionine, phenylalanine, proline, serine, threonine, thryptophan, tyrosine, and valine.

After coupling the first amino acid residue to the (alkylene glycol) chain, a sequential peptidic coupling strategy can be used to introduce the desired number of amino acid substituents with the desired sequence. Examples of oligo(ethylene glycol) functionalization with dialanine peptidic sequence is given in the Examples section.

Some examples of coupling reagents that may be used for the peptidic coupling are carbodiimide derivatives (such as dicyclohexyl carbodiimide, 1-Ethyl-3-(3-dimethylaminopropyl)-carbodiimide), carbonyldiimidazole, phosphonium derivatives (such as benzotriazole-1-yloxy-trisphosphonium hexafluorophosphate, bromo-tris-pyrrolidino phosphonium hexafluorophosphate), uronium derivatives (such as 2-(1H-7-Azabenzotriazol-1-yl)-1,1,3,3-tetramethyl uronium hexafluorophosphate, O-Benzotriazole-N,N,N',N'-tetramethyl-uronium-hexafluoro phosphate).

An example of amino acid coupling strategy also includes the activation of a carboxylic group by direct formation of anhydride and acyl-halides. General strategies and reagents have been recently discussed by E. Valeur and M. Bradley, *Chem. Soc. Rev.* 2009, 38. 606-631.

Following the introduction of the desired peptidic sequence, the N-terminus of the peptidic segment is formylated with an adequate formylation method. This formylation may include the treatment of the product with formyl salts, formic acid, or other formylating agents. Examples of the use of sodium formate is given in the following section.

Some examples of formylation strategies make use of formate salts (such as sodium or potassium formate), alkyl formates (such as methyl-, ethyl-, or propyl-formate), formic acid, chloral and derivatives. The isocyanide is then formed by treating the formamide with an appropriate dehydration agent. An example of dehydration strategy making use of diphogene is given in the following section. Several examples of dehydration agents that may also be used are phosgene and derivatives (di-, triphosgene), carbodiimides, tosyl chloride, phosphorous oxachloride, triphenylphosphine/tetrachlorocarbon (M. B. Smith and J. March *"March's advanced organic chemistry"* 5th edition, Wiley & Son eds., 2001, New York, USA, pp. 1350-1351 and ref. herein).

The oligo(alkylene glycol) containing isocyanopeptides are subsequently polymerized.

Preferably, the polymerization is carried out by the use of a nickel(II) salt. Examples of Ni(II) salts that can advantageously be used for the polymerization of oligo(alkylene glycol)isocyanopeptides are nickel(II) halides, nickel(II) perchlorate or tetrakis-(tertbutylisocyanide)nickel(II) perchlorate. Other complexes and nickel salts might be used provided that they are soluble in the polymerization medium or initially dissolved in an adequate solvent that is miscible in the polymerization medium. General references describing some catalytic systems that may be used to polymerize the oligo(alkylene glycol)isocyanopeptides may be found in M. Suginome and Y. Ito, *Adv. Polym. Sci.* 2004, 171, 77-136, and R. J. M. Nolte, *Chem. Soc. Rev.* 1994, 23(1), 11-19.

The polyoligo(ethylene glycol) isocyanopeptides are preferably prepared in the presence of an apolar solvent. Suitable apolar solvents may be selected from the group consisting of saturated hydrocarbon solvents and aromatic hydrocarbon solvents or mixtures thereof. Examples of apolar solvents are pentane, hexane, heptane, 2-methylbutane, 2-methylhexane, cyclohexane, and toluene, benzene xylenes or mixtures thereof. Preferably, toluene is used in the process of this disclosure.

Preferably, toluene is chosen for the polymerization process of oligo(ethylene glycol) isocyanopeptides where the oligo(ethylene glycol) part contains at least three ethylene glycol units and the peptidic segment consists of a dialanine motif, indifferently of both alanines chirality.

Preferably, the monomer concentration is chosen above 30 mmol/L and the catalyst/monomer ratio chosen between 1/100 and 1/10,000. Lowering the amount of nickel(II) (catalyst/monomer ratio below 1/1000), thus, permits the preparation of materials exhibiting a substantial degree of polymerization (mean DP>1200), which is desired for subsequent application of the polymers as macro-hydrogelators. Examples of generic polymerization conditions are given in the following section.

Several isocyanopeptides may be functionalized with various linear or non-linear oligo-(alkylene glycol) side chains having variable chain length. The alkylene glycol may be selected from the group consisting of ethylene-, propylene-, butylene- or pentylene-glycol. Preferably, the isocyanopeptides are functionalized with at least three ethylene glycol side chains. The peptides may comprise L-amino acids, D-amino acids or D, L-amino acids. The obtained oligoalkylene-functionalized polyisocyanopeptides are a new class of materials with unique thermo-responsive properties.

The polymerization method according to the disclosure can be applied to the preparation of co-polymers with restrictive conditions regarding the compatibility of monomers, in terms of reactivity and possible inference in the process of polymerization. Preferably, monomers of close structure are co-polymerized. Preferably, monomers of identical peptidic sequence and chirality are co-polymerized. Examples of co-polymerization are given in the following section.

Co-polymerization of adequately functionalized monomers may advantageously be used to introduce specific chemical groups that can be used to further modify the polymers prepared according to the described procedure. Examples concerning the introduction of acetylene or azide function on the polymer are given in the following section.

Co-polymerization of monomers bearing distinct oligo (ethylene glycol) side chains may advantageously be used to control the overall physical properties of the resulting materials and, more specifically, the thermo-responsive behavior of the polymers when dissolved into water. Examples concerning the copolymerization of tri- and tetra-(ethylene glycol)isocyanopeptides and the effect on the thermo-responsive properties of the resulting materials are given in the following section.

This disclosure further relates to oligo(alkylene glycol)-functionalized polyisocyanopeptides obtainable by the process of the disclosure.

The obtained oligo-ethyleneglycol substituted polyisocyanopeptides represent a new class of materials with promising properties, both in terms of biocompatibility and structural characteristics, and are good candidates to be further functionalized with numerous groups and especially biologically relevant molecules such as co-factors and vitamins, saccharides, oligosaccharides, amino acids, nucleic acids, oligonucleic acids, oligopeptides, proteins (proteins, glycoproteins, antibodies . . . ), and natural or non-natural biologically actives molecules.

These functional groups can be introduced via direct (co)polymerization of monomers that have been initially substituted with the targeted species or, advantageously, using a post-modification strategy. In the latter case, specific chemical functions like acetylenes or azides may be first introduced onto the monomers, which are then (co)polymerized with the desired co-monomer. This permits the general post-modification of preformed polymers using, for example, dipolar cycloadditions, with adequately substituted groups that can be the (bio)molecule of interest or any group that can further react on the (bio)molecule of interest.

Examples of groups that can be advantageously used are acetylene-functionalized maleimides, acetylene-functionalized NETS-esters, acetylene-functionalized carboxylic acids, acetylene-functionalized amines, acetylene-functionalized thiols and thioesters, or azido-functionalized analogs of the aforementioned groups.

The post-modification strategy allows for the use of very mild grafting conditions of the (bio)molecules to the polymers, providing the fact that the oligo(alkylene glycol) substituents that are part of the side chains are adequately chosen to permit the solubilization of the polymer in aqueous conditions.

The density of (bio)molecules or targeted species that are grafted onto the polymer chains can be systematically varied according to the initial ratio of monomer(s) that have been (co)polymerized, including both fully functionalized monomers or monomers presenting a function that can be further reacted to introduce the target species.

Specific examples of biomolecules that can be grafted onto the polymers according to the strategies described above comprise biotin, avidin and streptavidin derivatives; cell adhesion factors (RGD sequence), cell growth factors; enzymes (lipases, oxidases); monoclonal and polyclonal antibodies or coagulation factors.

The present invention further relates to hydrogels comprising the oligoalkylene-functionalized polyisocyanopeptides according to the disclosure.

It may relate to homogeneous hydrogels comprising the oligoalkylene-functionalized polyisocyanopeptides and also to heterogeneous hydrogels comprising mixtures oligoalkylene-functionalized polyisocyanopeptides with differing number of ethylene glycol units.

The obtained oligoalkylene-functionalized polyisocyanopeptides are capable of forming strong thermo-reversible hydrogels, at a low polymer concentration (0.1% wt/wt) with tunable gelation temperature. To physically gel water, the poly[oligo(ethylene glycol) isocyanopeptides according to the disclosure preferably have a degree of polymerization [DP] >1500.

The hydrogels obtained from the poly[oligo(alkylene glycol) isocyanopeptides] according to the disclosure differ from most of the previously reported polymer-based hydrogels in the highly structured nature of the network formed upon gelation. The network consists of twisted bundles of laterally aggregated polymer chains. This arrangement is similar to the structure of the fibrillar networks that are formed upon the gelation of low molecular weight hydrogelators. It is supposed that this phenomenon is related to the high persistence length of the poly(isocyanopeptide)s that favor an original mode of association. The association is triggered by the temperature-induced modulation of oligo (alkylene glycol) side chains hydrophilicity, which is a perfectly reversible phenomenon, resulting in a completely thermo-reversible aggregation/dissolution of the oligo(alkylene glycol)-coated poly(isocyanopeptides).

Classical description of physical polymer hydrogels comprise the formation of an entanglement network chain in concentrated solutions, formation of a percolation network due to spinodal demixing, micro-crystallites formation, and formation of micelles network or lamellar structures, which seemingly differ from the postulated association mode of the poly[oligo(alkylene glycol-i socyanopeptide]

The hydrogels resulting from the poly[oligo(alkylene glycol)isocyanopeptide] result from the lateral association of polymer fibers of about 5 nm in diameter into larger twisted bundles that form the base of the polymeric hydrogel network. This results in a highly porous structure with pore size that can go down to 100 nm in diameter according to preliminary studies.

The porosity of the hydrogels can be modulated according to the polymer concentration.

Due to the thermo-sensitive behavior of ethylene glycol side chains, these polymers present clear LCST transitions. For a given poly[oligo(alkylene glycol)isocyanopeptide], this temperature can be modified by varying the ionic strength of the solution (salt effect) or, more generally, by the addition of any compounds able to modify the overall solvation state of the polymers.

The LCST of the materials can be further modulated by acting on the poly(isocyanide) backbone and, namely, on its conformation, with the use of acids or any compounds that can lead to conformational changes of the backbone helix.

Another way to modulate the LCST of the polymers is to co-polymerize monomers bearing different oligo(alkylene glycol) side chains. For example, the polymerization of mixtures of tri- and tetra(ethylene glycol)isocyanodialanine in different ratios permitted to adjust the gellation temperature of the resulting copolymers between 22° C. and 60° C. in mQ water.

It has been found that the polymer chain length influences the gellation, whereby the longest chains [DP>1500] were found to be able to gel water even at low polymer concentration (0.1% w/v). The chains with a lower degree of polymerization had a strong tendency to precipitate rather than to form gels. It is expected that this is a general effect for stiff or semi-flexible polymers, which hydrophilicity can be varied without modifying the general structure of the chains (i.e., in rigid structures, the chain does not collapse but rather aggregates laterally with others chains to form extended fibers).

A further influence of polymer length has been observed in relation to the optical properties of the resulting gels. It was found that hydrogels prepared from chains with a lower degree of polymerization were prone to be turbid or opaque. Increasing the mean degree of polymerization resulted in a decrease of opacity of the hydrogels leading eventually to fully optically transparent materials.

Another interest of poly[oligo(alkylene glycol)isocyanopeptide]s is the possibility to prepare functionalizable analogs (incorporating, for example, either acetylene or azido groups into the side chains) without modifying their ability to form well-defined hydrogels under appropriate conditions. It, therefore, permits functionalizing the surface of the polymer fibers that form the hydrogels. This may be used, for example, to functionalize the hydrogels with biologically relevant molecules as discussed above for the polymer chains. Such functionalizable gels can also be further chemically cross-linked with an appropriate cross-linker to stabilize their structure and avoid redissolution of the hydrogels and reduce their erosion.

The self-assembly process that results in the gelation of the polymers can also be advantageously used to prepare thin porous films (thickness below 20 nm), presenting pore size that can be below 100 nm according to the concentration of the polymer solutions that have been used to coat the surface. These coatings present similar properties in terms of biocompatibility and possible functionalization as that described for the parent poly[oligo(alkylene glycol) isocyanopeptide]s. Like described above, adequately functionalized films can be further stabilized via cross-linking to result in a stable porous films.

The gel temperature may be adjusted to some extent, with the possibility to form stable structured gels at 25° C., leading, therefore, to a new biomimetic matrix that can be used to encapsulate enzymes or cells and preserve their activity in vitro.

The hydrogels also present interesting optical properties (perfect transparency), which are very useful in the study of single enzyme dynamics with fluorescence microscopy. For such studies, thermo-reversible physical hydrogels according to the disclosure are of tremendous interest since they permit an extremely mild and easy sample preparation (mixing enzyme solutions in buffer with concentrated polymer solutions at low temperature and warm the system up to room temperature) fully compatible with biomolecule handling. Moreover, the introduction of reactive groups onto the oligo-alkylene side chains does not diminish their ability to gel water. This might lead to theoretically functionalizable hydrogels that may find diverse applications, both in enzyme immobilization and processing and more advanced systems such as injectable thermo-reversible hydrogels for tissues engineering.

The disclosure further relates to coatings comprising the oligoalkylene-functionalized polyisocyano-peptide according to the disclosure. The disclosure may further be used to prepare optically active material for chiral separation in water, injectable biocompatible thermo-gelling agent for tissue engineering (non-functionalized polymers or functionalized with peptides for cell adhesion, stimulation, or biocompatible synthetic extracellular matrix mimic/matrix for neurone regeneration (biologically active aligned fibers).

The hydrogels provided herein may advantageously be used for the bioactive coating of surfaces (biocompatible nanoporous biodegradable or persistent [cross-linked materials] films, or membranes), for the stabilization of biomolecules and cells in organic and aqueous media for catalysis. These hydrogels may be prepared by covalent linking of the biomolecules or cells, by physical trapping of biomolecules or cells.

The hydrogels of the disclosure may also be used as an injectable thermo-gelling agent for tumor ablation (tumor "choking") or a biocompatible gelling polymer for blood coagulation or as a chiral thermo-sensitive surface with controllable hydrophilicity/anti-fouling and antibacterial properties for biosensors applications.

The polymers according to the disclosure appeared to have some interesting and advantageous properties. Due to the length and the stiffness of the polymer, the gels were made up of 99.00 to 99.98% water. This means that there is only very little material required to generate a large volume. A single wire of the polymer appeared to have a diameter of 4 nanometers and a molecular weight of 2,500,000 Da. The polydispersity index (PDI) was 1.6 and an average chain length varied between 500 nm -2 micrometers. The polymers appeared to be rather stiff, persistence length of 70-90 nm. It was also possible to obtain left- and right-handed helices according to the peptide fragment chirality (optically active materials). A well-defined fibril network with pore size controlled by polymer concentration, even to 100-250 nm, was also able to be produced. It was also possible to introduce efficiently reactive side groups in the chains. The polymers may, therefore, be used as a scaffold for biomolecules. Deposited films of the material were found to be nanoporous. It was found that the porosity size is controlled by the concentration. The polymers contain anchor points to which any biomolecule can be attached by standard bioconjugation such as antibodies and recognition peptides. The films of the material according to the disclosure also have anti-fouling properties. It may also be used as a hydrogel, which is not toxic, for instance, as a biotrap or biosensor. They also have a tunable gelation temperature with the possibility to form stable structures. The gels may be thermo-reversible at low polymer concentrations. The gelation temperature can be tuned between 23 and 52 degrees Celsius. The gels and films are reverse gels and may, therefore, be suited for in vitro injection and drug release. They are also optically transparent and ultra light.

They may advantageously be used in a filter film for the collection and analysis of nanoparticles.

They may also be used as biocompatible biogels for delivering medications inside and outside the body. When functionalized, they may be used for the bioactive coating of surfaces. They may also be used in anti-bacterial coatings if D-amino acids are used or with nano-silver. They may function as a scaffold for tissue regeneration, nerve regeneration, or for orthopedic applications, cartilage or bone replacement. It may also be used as a biomimetic matrix to encapsulate enzymes and cells and preserve their activity in vitro. They may be used in packaging materials with ultra-thin coatings with anti-microbial function and also as synthetic gell for wound application if fibrinogen modified fibers are used. If electro-conductive groups are introduced, they could function as hydrogels for biofuel cell applications.

BRIEF DESCRIPTION OF THE DRAWINGS

The disclosure will now be illustrated by the following examples without being limited thereto.

DETAILED DESCRIPTION

Experimental part

Figure 1:
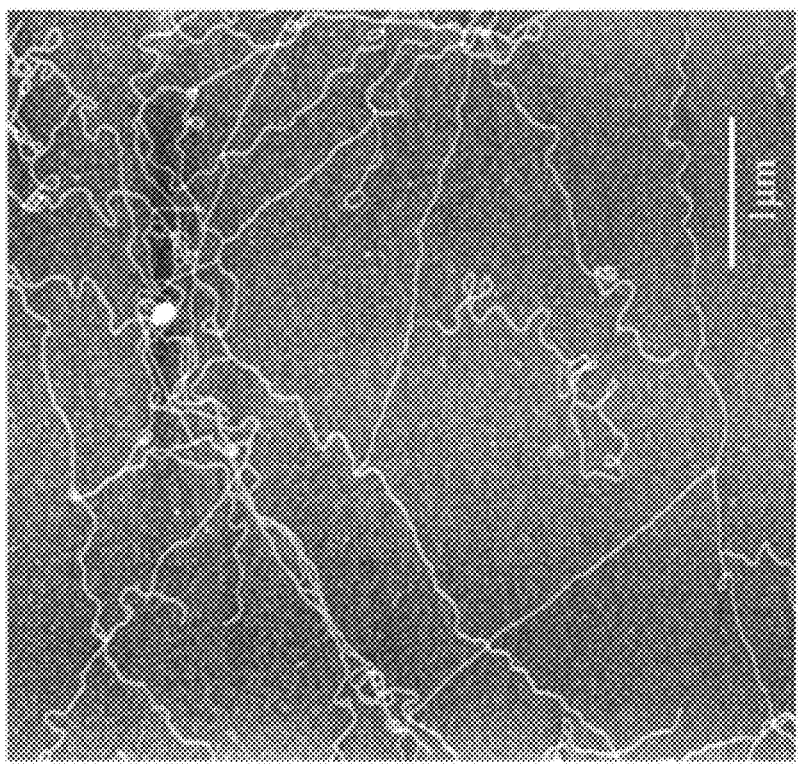
FIG. 1 shows a schematic representation of the helical oligo-alkylene-functionalized polyisocyano-peptides based on a dialane unit (top middle). The backbone folding is stabilized by a hydrogen bounding network that develops within the helix, between the stacked amide bounds of the side chains (bottom middle). This secondary structure leads to very stiff chains as visualized by AFM (right).
Figure 1:
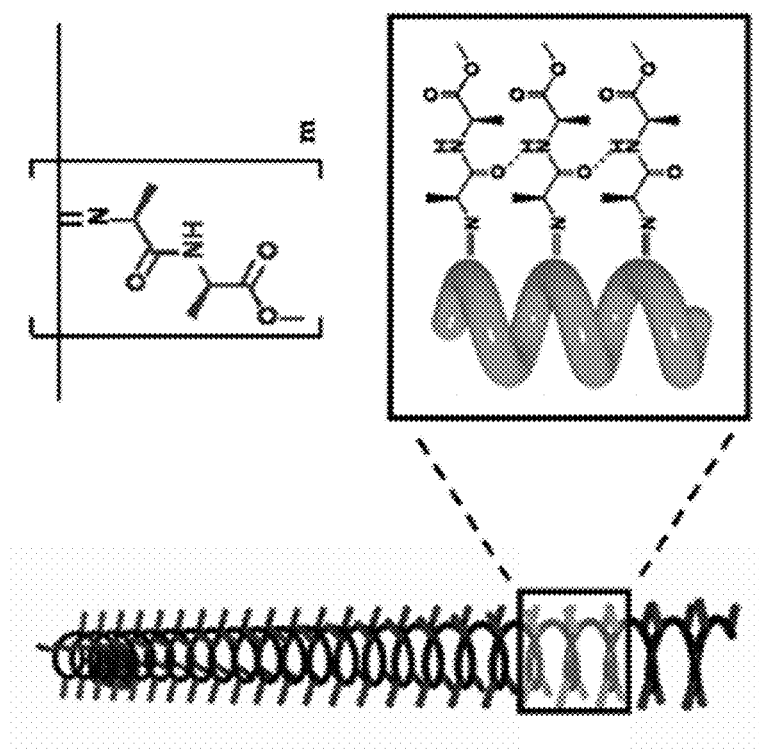

Oligo(ethylene glycol)-substituted isocyanopeptides have been synthesized and polymerized with the use of Ni(II) salts. The thermo-responsive properties of these newly prepared non-linear poly(ethylene glycol) analogs have been investigated in details in aqueous conditions. As reported for other oligo(ethylene glycol) decorated polymers, both the length of the side chains and the degree of polymerization (DP) of the poly(isocyanopeptide) core were found to have a great influence on the transition temperature of the materials. In good agreement with previous work, both shortening the length of the oligo(ethylene glycol) substituents and increasing the DP of the poly(isocyanopeptide), resulted in the lowering of the demixing temperature of their aqueous solutions. Remarkably, poly(isocyanopeptide) chains of high DP led to the reversible formation of strong hydrogels above a critical temperature, even at low polymer concentration (0.1 wt %). AFM studies indicate the formation of a highly structured fibrillar network in the gel state, reminiscent of some structures observed for low molecular weight gelators and polysaccharide (hydro)gels. It has been proposed that the stiff and well-defined helical poly(isocyanopeptide) backbone promotes the hierarchical assembly of the polymers into an extended fibrillar network when the oligo(ethylene glycol) corona hydrophilicity is lowered at higher temperature. It is assumed that the gelation ability of this new class of polymer can be extended to other stable, semi-flexible polymers that reach a critical stiffness/chain length (DP) ratio and that bear side chains of tunable hydrophilicity.

Non-linear poly(ethylene glycol) (PEG) analogs have recently attracted a great deal of attention for the development of innovative water-soluble materials.[1] Such PEG analogs are classically prepared from the (co)polymerization of macro-monomers bearing oligo(ethylene glycol) substituents. The solution properties of the resulting comb-like polymers arise from the fine balance between the hydrophilic/hydrophobic characteristics of the grafted moieties and of the polymeric core. The introduction of oligo(ethylene glycol) side chains, for which the hydrophilicity is temperature dependent, offers a simple and elegant way to trigger the overall hydrophilic/hydrophobic balance of these materials and, therefore, provides a straightforward approach to the development of a variety of thermo-responsive systems.[2] So far, most non-linear PEG analogs have been derived from vinyl,[3,4] (meth)acrylate,[5,6,7,8,9,10] and styrene[5,11] monomers. Only a few examples have been reported on the synthesis of oligo(ethylene glycol)-functionalized poly(isocyanide)s. These have been prepared either by post-modification of a poly(isocyanide) backbone by peptidic coupling[12] and the copper-catalyzed Huisgen 1,3-dipolar cycloaddition,[13] or through the direct polymerization of crown-ether appended precursors.[14] The thermo-responsive properties of the resulting materials have, however, not been explored in detail and the direct polymerization of oligo(ethylene glycol)-functionalized isocyanides led to materials with only a limited degree of polymerization.[14] In this contribution, an optimized protocol for the preparation of oligo(ethylene glycol)-coated poly(isocyanopeptide)s is described and the basic properties of this class of non-linear PEG analogs is discussed.

Poly(isocyanides) are one of the most studied static helical polymers. They consist of poly(imine) chains in which every carbon atom of the backbone bears a substituent, resulting in an extremely dense comb-like architecture; helical folding permits the minimization of steric repulsion between the pendant side-chains.[15,16,17,18,19] The introduction of peptide-containing side chains leads to materials with unprecedented stiffness.[20,21] This effect has been attributed to the development of an intramolecular hydrogen-bonding network between the peptide pendants, which adopt a β-sheet-like arrangement along the helical poly(imine) core.[20] Such a well-defined structure has naturally attracted much attention for the use of these materials as synthetic platforms to order various photo- and electro-active species for optoelectronics applications.[22,23,24,25] With the aim of developing non-ionic water-soluble analogs, the improvement of the synthesis of oligo(ethylene glycol)-coated poly(isocyanopeptides) was focused on first.

Figure 2:
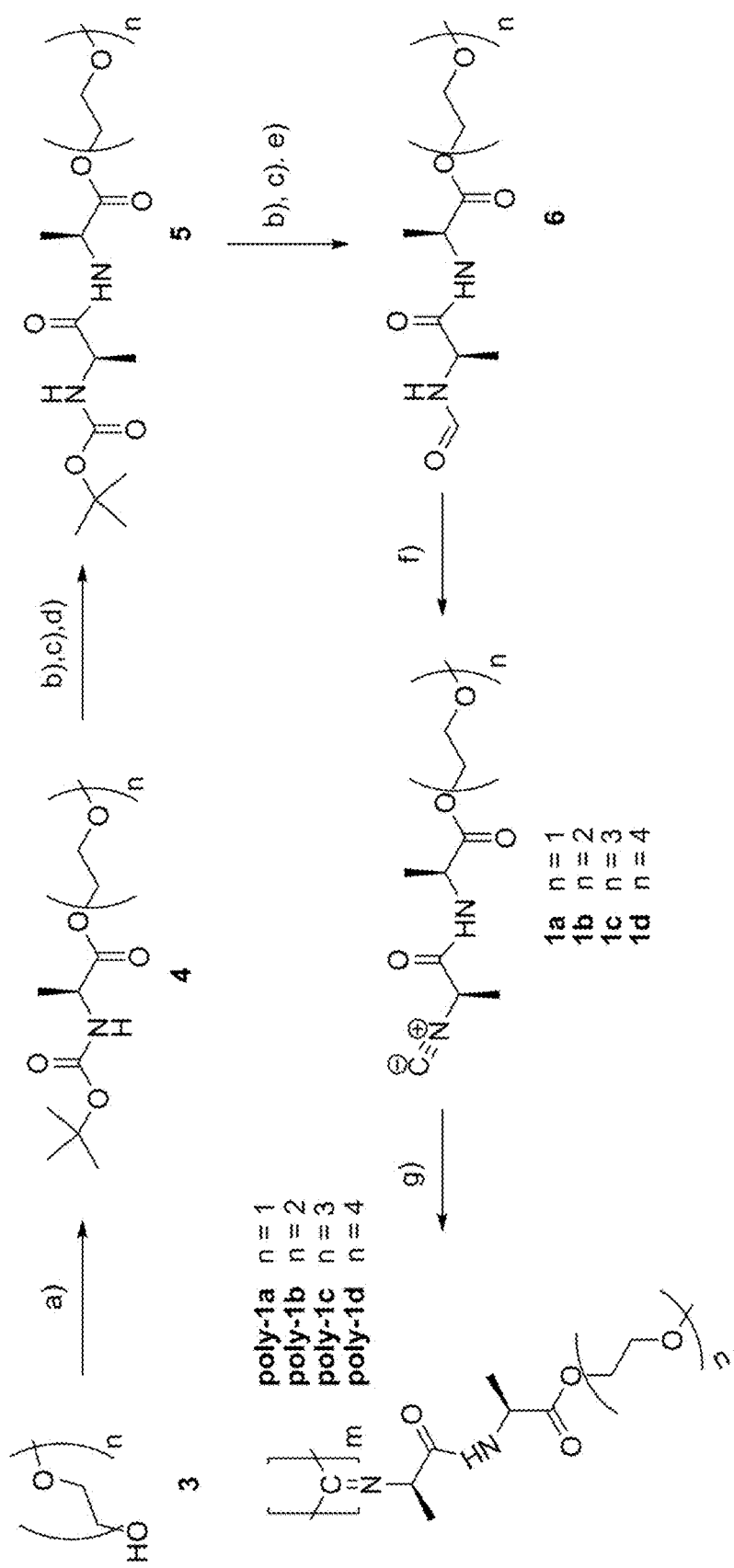
FIG. 2 shows the preparation of polymers poly- 1a-d; a) N-Boc(L)Ala, DMAP, DCC, CH2Cl2, 4 hours, 0° C-RT (75-90%); b) EtOAC/HCl (100%); c) tBuOH (100%); d) N-Boc(D)Ala, DIPEA, DCC, CH2Cl2, 4 hours, 0° C-RT (75-85%); e) NaOOCH/HCOOH reflux, 3 hours (85-95%); f) NMM, diphosgen, CH2Cl2, −78° C. (60-75%); g) Ni(ClO4)2/MeOH, toluene, RT, 4 hours (60-80%).

As alluded to above, the fine balance between the polymer core and the hydrophilic character of the polymer side chains governs the water solubility of non-linear PEG analogs. In the case of acrylate derivatives, it has been shown that side chains composed of two ethylene glycols units were sufficient to lead to fully water-soluble materials,[26] whereas three ethylene glycol units were required in the case of the more hydrophobic styrene derivatives.[11] To address the question of glycol substituent length versus water solubility for the densely functionalized poly[oligo(ethylene glycol)isocyanopeptide]s, three isocyano-dialanine derivatives bearing two, three, or four ethylene glycol units have been prepared and polymerized (FIG. 2).

Compounds 1a-c were derived from di-, tri-, and tetra-ethylene glycol monomethyl ether, respectively. A classical two-step dicyclohexyl carbodiimide coupling strategy was used for the successive introduction of the (L)- and (D)-N-Boc protected alanine moieties. After the introduction of the desired dialanine motifs, the Boc-protecting end-group was cleaved off. The compounds were formylated and subsequently dehydrated with diphosgene, using N-Methylmorpholine as a base, to yield the desired isocyanides 1a-c in acceptable yields (overall yields 30-60%).

Polymerization

Acid-induced polymerization is the historical method for the preparation of poly(isocyanide)s.[27] In the case of dialananyl-isocyanides, chains with an exceptionally high degree of polymerization (DP>10000) can be obtained, but this is strongly dependent on the stereochemistry of the dipeptide fragments;[20,28] either LD or DL diastereomers are required. Despite presenting a proper stereochemistry (i.e., the DL form), compounds 1a-c could not be polymerized in the presence of acid, but were hydrolyzed over time under all the conditions tried ([1a-c] 30-300 mM in dichloromethane, chloroform, and toluene, [H$^+$] 1.5-12.5 mol %, 25° C.). Subtle steric factors were proposed to explain the low reactivity of inadequate diastereomeric forms of the dipeptide derivatives.[28] Similarly, the introduction of flexible and sterically demanding oligo(ethylene glycol) side chains on the isocyanides 1a-c may greatly lower their reactivity toward acid-induced polymerization. Therefore, the more robust nickel catalyzed polymerization introduced by Drenth and Nolte[29] was focused on. During the preliminary experiments, poly-1a was easily obtained with the classical conditions described for related isocyano(dipeptide)s derivatives (dichloromethane, [Ni(ClO$_4$)$_2$·6H$_2$O], 1 mol %). Poly-1b-c were, however, not obtained in satisfactory yields using the same protocol. Extensive tests were carried out to improve the polymerization conditions of isocyanides 1b-c.

Figure 3:
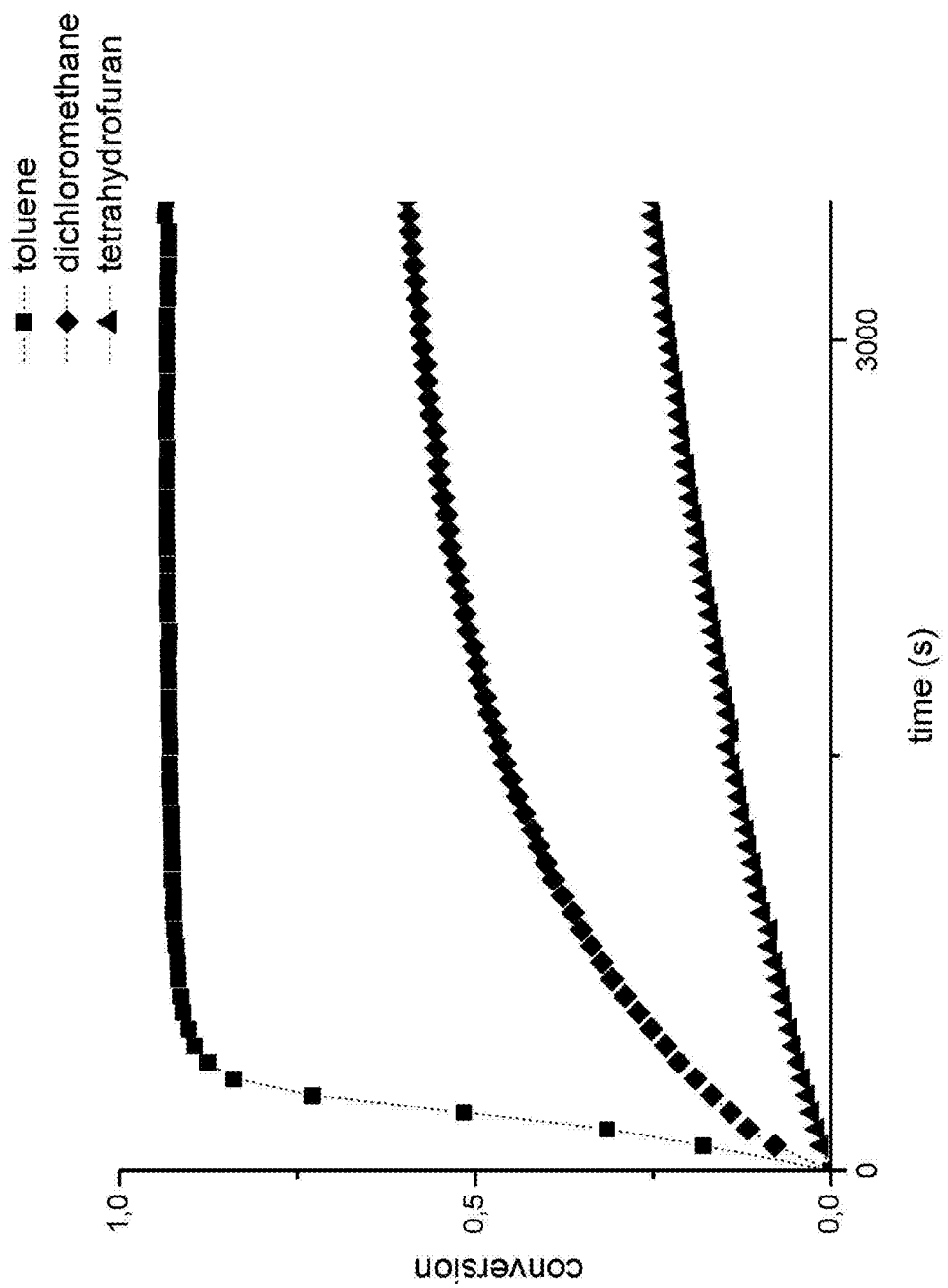
FIG. 3 depicts conversion of 1c to poly-1c followed by IR spectroscopy. 1c solutions (0.03 mol/L) in toluene (■), dichloromethane (♦), and tetrahydrofuran (▲), treated with methanolic aliquots of Ni(ClO4)2.6H2O (final concentration 0.3 μmol/mL).

The nickel-catalyzed polymerization of isocyanides can be greatly influenced by the solvent used, both in terms of yields[17] and final polymer structure.[30,31] To investigate these aspects with the newly prepared oligo(ethylene glycol) isocyanopeptides, isocyanide 1c was treated with nickel(II) salts at room temperature in toluene, dichloromethane, tetrahydrofurane, and methanol. In these experiments, toluene was found to systematically lead to the highest yields, but no clear solvent effect regarding the polymer conformation could be evidenced with circular dichroism (CD) spectroscopy. Besides the marked difference in polymerization efficiency, the solvents were found to have a drastic influence on the polymerization rate. By following the disappearance of the isocyanide stretching band using IR spectroscopy, the conversion of 1c into poly-1c could be monitored over time (FIG. 3). The relative polymerization rates (Kp) according to the different solvents were found to follow the order Kp[toluene]>Kp[dichloromethane]>Kp[tetrahydrofuran]. Unfortunately, the polymerization kinetics diverge from simple first order in all cases and no rate constant could be extracted. Furthermore, the reaction could not be followed by IR spectroscopy in methanol due to the broad absorption spectrum of this solvent.

A similar solvent dependence on the rate of polymerization was observed for isocyanide 1b). Moreover, 1b was found to polymerize faster than 1c in all cases. Although not optimal to solubilize poly-1a, toluene was preferred on the basis of the above-described IR experiments for the polymerization of all three oligo(ethylene glycol) isocyanide monomers.

Monomers 1a-c were dissolved in toluene (0.030-0.300 mol/L) and subsequently treated with methanolic aliquots of $Ni(ClO_4)_2 \cdot 6H_2O$ under aerobic conditions at room temperature. After the required reaction time (2-12 hours, according to the monomer/catalyst ratio; the reactions were followed by TLC), the polymers were precipitated against diethyl ether and further purified by precipitation in THF/diethyl ether mixtures to afford the desired materials in satisfactory yields (75%-90%). The degree of polymerization (DP) of the resulting materials could be roughly controlled according to the initial monomer/catalyst ratio (Table 1). For identical monomer/catalyst ratios, the DPs of the prepared polymers varied significantly between the different isocyanides ($DP_{poly-1c} < DP_{poly-1a} < DP_{poly-1b}$, Table 1). In the case of 1a, the reaction mixture turned rapidly into a gel when a monomer/catalyst ratio of 100/1 was used; therefore, higher ratios were not tested. Since the influence of the gelation of the reaction mixture on the polymerization of 1a has not been explored in detail, it is difficult to draw a conclusion on the observed monomer-DP relationship.

TABLE 1

Principal characteristics of poly-1a-c

| polymer | [monomer]/[Ni] | $Ln^a$ (nm) | $DP^a$ | $Mw/Mn^a$ | critical temperature (° C.) | $[\alpha]^c$ ($10^{-1}$ deg $cm^2$ $g^{-1}$) |
|---|---|---|---|---|---|---|
| poly-1a | 100 | 207 | 1760 | 1.5 | $nd^d$ | +76 |
| poly-1b | 100 | 309 | 2630 | 1.6 | $35^e$ | +105 |
| poly-1b | 10000 | 859 | 7310 | 1.5 | $22^e$ | $nd^f$ |
| poly-1c | 100 | 81 | 690 | 1.3 | $52^b$, $50^e$ | +175 |
| poly-1c | 10000 | 518 | 4410 | 1.7 | $42^e$ | $nd^f$ |

$^a$Determined on the basis of AFM micrograph analysis, the mean DP values were calculated from Ln values assuming an identical helical pitch (0.47 nm) for all three polymers;
$^b$determined from absorption measurements at 450 nm (UV, solution at 1 mg/mL);
$^c$from solutions in chloroform;
$^d$not water soluble;
$^e$determined from scattering intensity (DLS, solution at 1 mg/mL);
$^f$not determined.

Backbone Conformation

Figure 4:
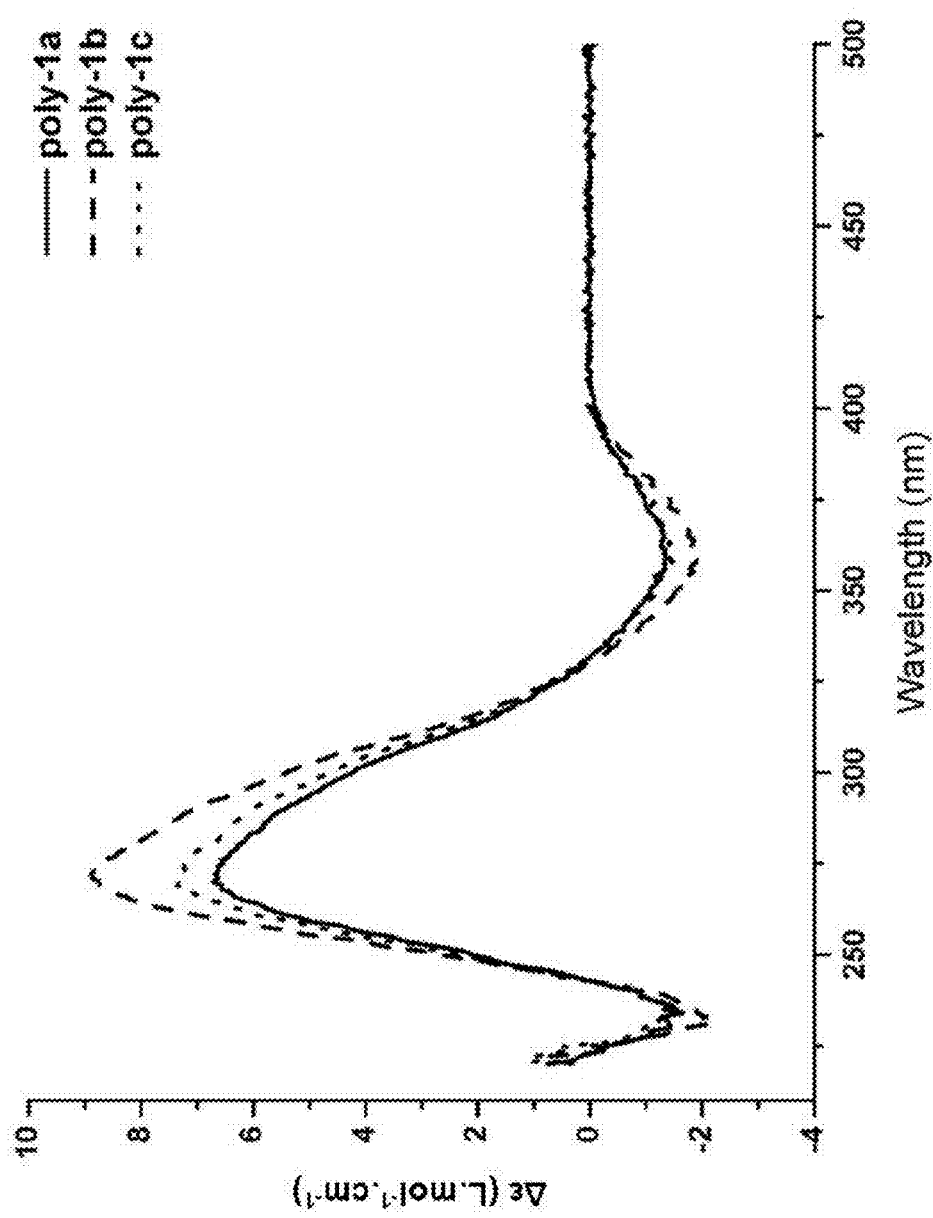
FIG. 4 depicts CD spectra of poly-1a-c solutions in dichloromethane at 25° C.

Poly(isocyanodialaninyl methyl ester) possesses a very characteristic signature (i.e., an intense Cotton effect centered at λ=310 nm) in circular dichroism (CD) spectroscopy. The classical signal is negative for poly((D)-isocyanoalanyl-(L)-alanyl methyl ester) (poly-(DL)-IAA). This signal has been attributed to the n-π* transition of the imine groups, which are trapped in a pseudo $4_1$ helical symmetry, and interact with the strong dipole that can develop along the polymer backbone (as a result of the ideal β-sheet-like packing of the peptidic pendants).[20,32] The presence of oligo(ethylene glycol) moieties in poly-1a-c resulted in materials possessing altered CD spectra. In all cases, a bisignate curve presenting a main positive component centered at λ=272 nm and a smaller negative component centered at λ=360 nm was observed. The three polymers presented signals of comparable shape regardless of the oligo(ethylene glycol) chain length, which suggests similar backbone conformations and side chain orientations in poly-1a-c (FIG. 4).

Comparable CD signals have previously been reported for the polymerization of heptyne-functionalized (D)-isocyano-alanyl-(L)-alanyl esters.[33] Although very pronounced, this signal alteration has not been related to major backbone conformational changes. Rather, it has been assigned to a perturbation of the permanent dipole, which interacts with the n-π* imine dipole transitions due to a slight reorientation of the peptidic pendants to accommodate the steric constraints introduced by the heptyne side chains. IR spectroscopy supports a similar interpretation in the case of poly-1a-c. As shown in Table 2, N—H and $C=O_{amide\ I}$ stretching bands are strongly red-shifted after the polymerization of isocyanides 1a-c. This effect is an unambiguous signature of the development of hydrogen bonds between the poly-1a-c side chains. The IR signatures are very similar for all three polymers, suggesting an identical hydrogen bounding pattern, that is, an identical core structure for poly-1a-c, in good agreement with CD spectroscopy measurements. The N—H stretching bands are slightly less shifted than expected for the optimal β-sheet-like packing, as observed in poly-(DL)-IAA (vN—H~3268 vs. 3252 $cm^{-1}$, respectively) and are very similar to the values observed for the heptyne-funcationlized polymers synthesized previously.[33] It is, therefore, proposed that poly-1a-c present the classical $4_1$ helical conformation of poly(isocyanopeptide)s with a slightly perturbed orientation of the side chains due to the steric constraints introduced by the oligo(ethylene glycol) substituents.

TABLE 2

Selected IR data for 1a-c monomers and poly-1a-c solutions (dichloromethane, 30 mM, 25° C.).

| Compounds | N—H stretch ($cm^{-1}$) monomer | N—H stretch ($cm^{-1}$) polymer | C=O amide I ($cm^{-1}$) monomer | C=O amide I ($cm^{-1}$) polymer |
|---|---|---|---|---|
| (DL)-IAA | $3416^a$ | $3252^a$ | $1688^a$ | $1657^a$ |
| 1a | 3421 | 3268 | 1689 | 1656 |
| 1b | 3420 | 3267 | 1690 | 1656 |
| 1c | 3421 | 3269 | 1690 | 1657 |

$^a$Extracted from ref.[20]

Water Solubility and Thermo-responsive Behavior

Figure 5:
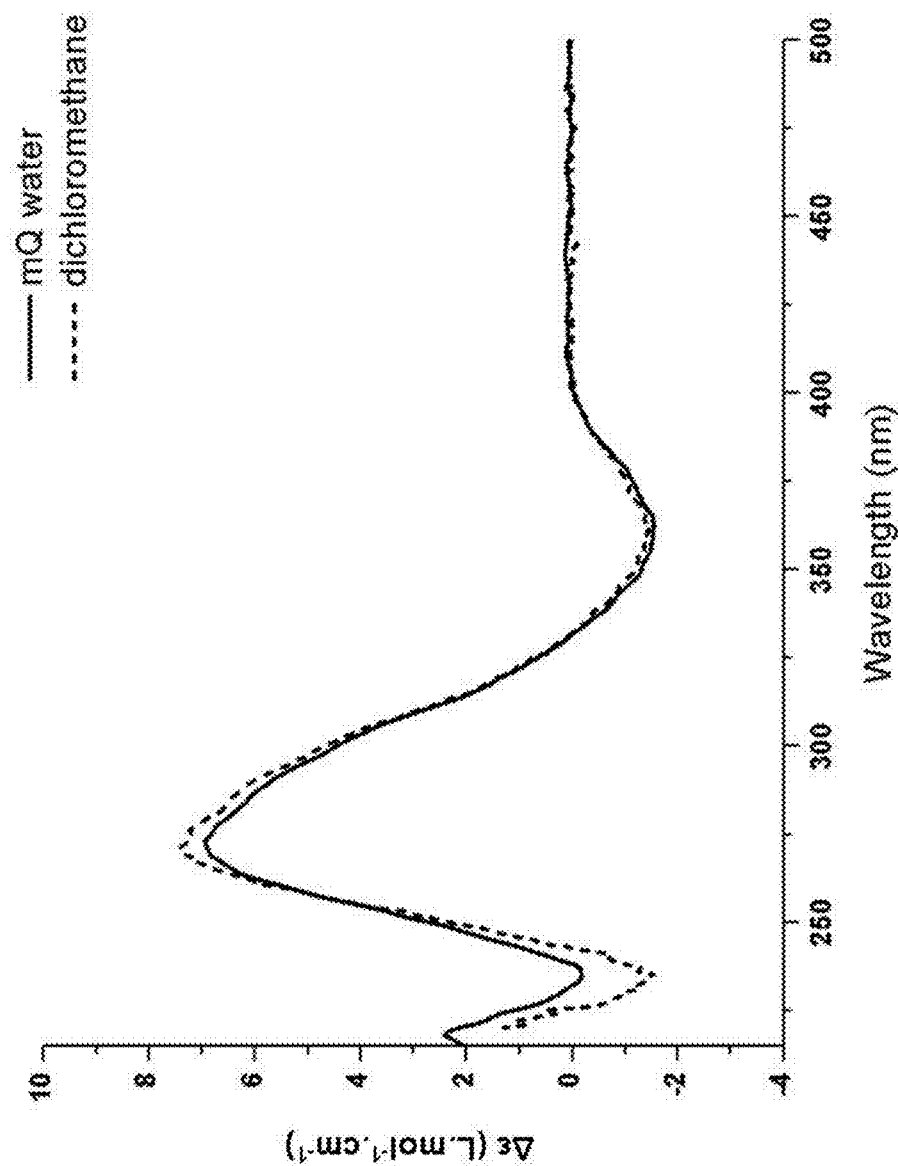
FIG. 5 depicts CD spectra of poly-1c in dichloromethane (dashed line) and mQ water (solid line) at 25° C.

As expected, the water solubility of poly-1a-c is directly related to the length of the oligo(ethylene glycol) fragments. Poly-1b-c were found to be highly water soluble, whereas poly-1a could not be dissolved or swollen, even in cold water (1-2° C.). Poly-1b-c exhibit almost identical CD spectra in aqueous and organic media, which confirms the stability of the helical poly(isocyanopeptide) core in water (FIG. 5).

In good agreement with examples reported in the literature for non-linear PEG analogs, aqueous solutions of poly-1b-c presented thermally induce phase separations, in which the transition temperatures were related to the length of the ethylene glycol side chains and to the degree of polymerization of the isocyanopeptides. Due to the marked differences in the DP values of the polymers, direct comparison between the poly-1b and poly-1c systems is limited to general considerations. Only major trends will be discussed in the following paragraphs.

As expected, demixing generally occurred at lower temperatures for poly-1b than for poly-1c and increasing the DP values of the chains resulted in a lowering of the transition temperatures (Table 1). In the case of 1 mg/mL aqueous solutions of poly-1c, chains with a DP of ~700 start to aggregate above 50° C., leading to the precipitation of poly-1c. This transition could easily be followed by UV-Vis spectroscopy due to the increase in turbidity of the medium.

Figure 6:
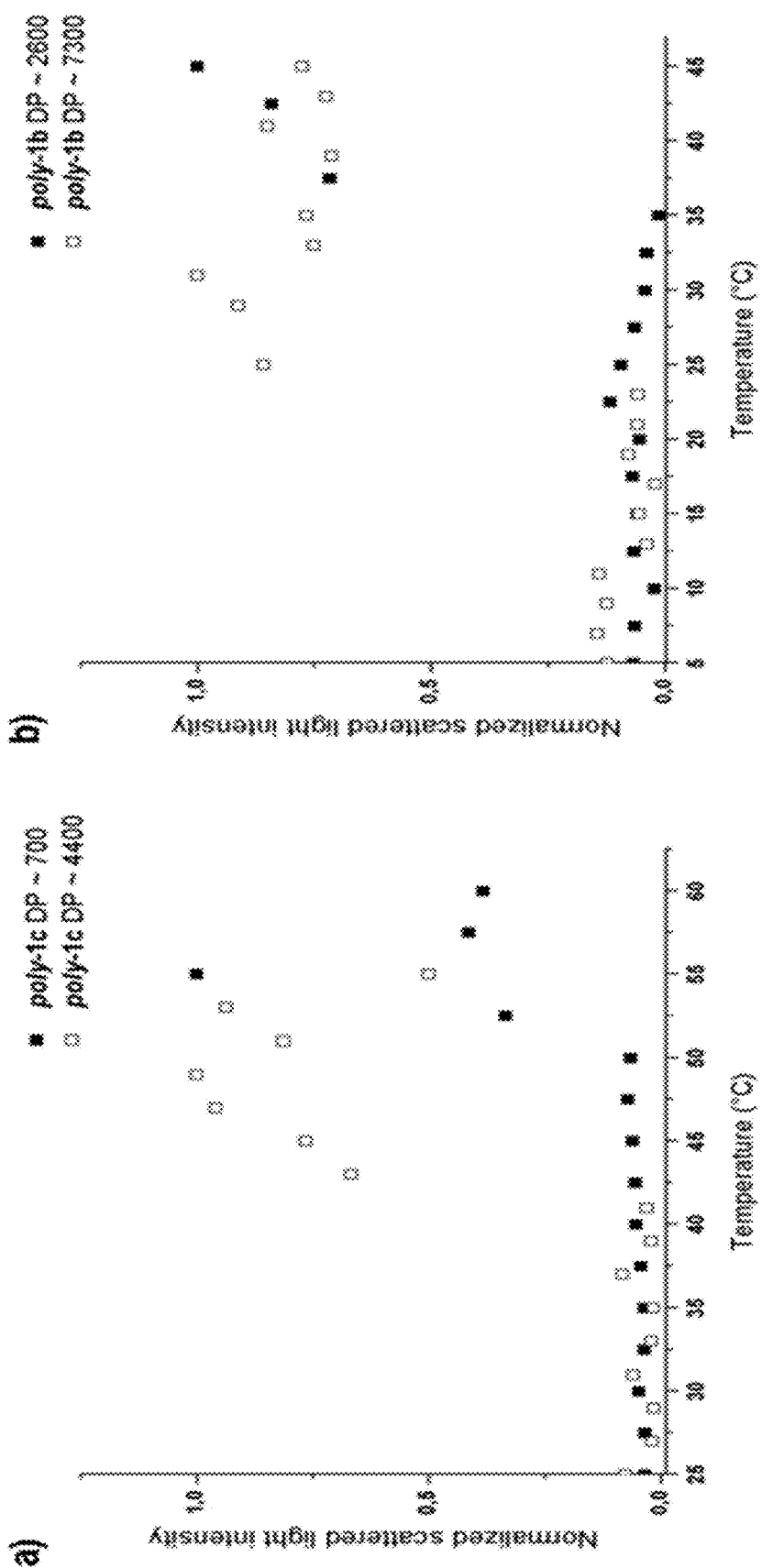
FIG. 6 shows scattered light intensity of aqueous solutions of poly-1b and poly-1c (1 mg/mL) as a function of temperature. a) poly-1c solutions, DP of ~700 (■) and ~4400 (■); b) poly-1c solutions, DP of ~2600 (■) and ~7300 (■).

The precipitation was found to be fully reversible; that is, a clear solution was recovered upon the cooling of the medium. Interestingly, for chains of higher DP (~4400), the medium remained optically transparent over the whole range of temperatures explored. A clear transition could, however, be evidenced with the help of DLS measurements, which showed an abrupt change in the scattered light intensity above 42° C. (FIG. 6, Panel a). This observation was associated to the formation of an optically transparent hydrogel. Similar increases in scattered light intensities were observed for 1 mg/mL aqueous solutions of poly-1b, above 35° C. and 22° C. for chains of DP ~2600 and 7300, respectively (FIG. 6, Panel b). These transitions were also associated with the formation of hydrogels.

These sol-gel transitions were again fully reversible; that is, upon decreasing the temperature, fluid solutions were recovered from all hydrogels. Cycles could be repeated several times without noticeable changes in the gelation abilities of the polymer or without significant shifts in phase transition temperatures.

Characterization of the hydrogels

Figure 7:
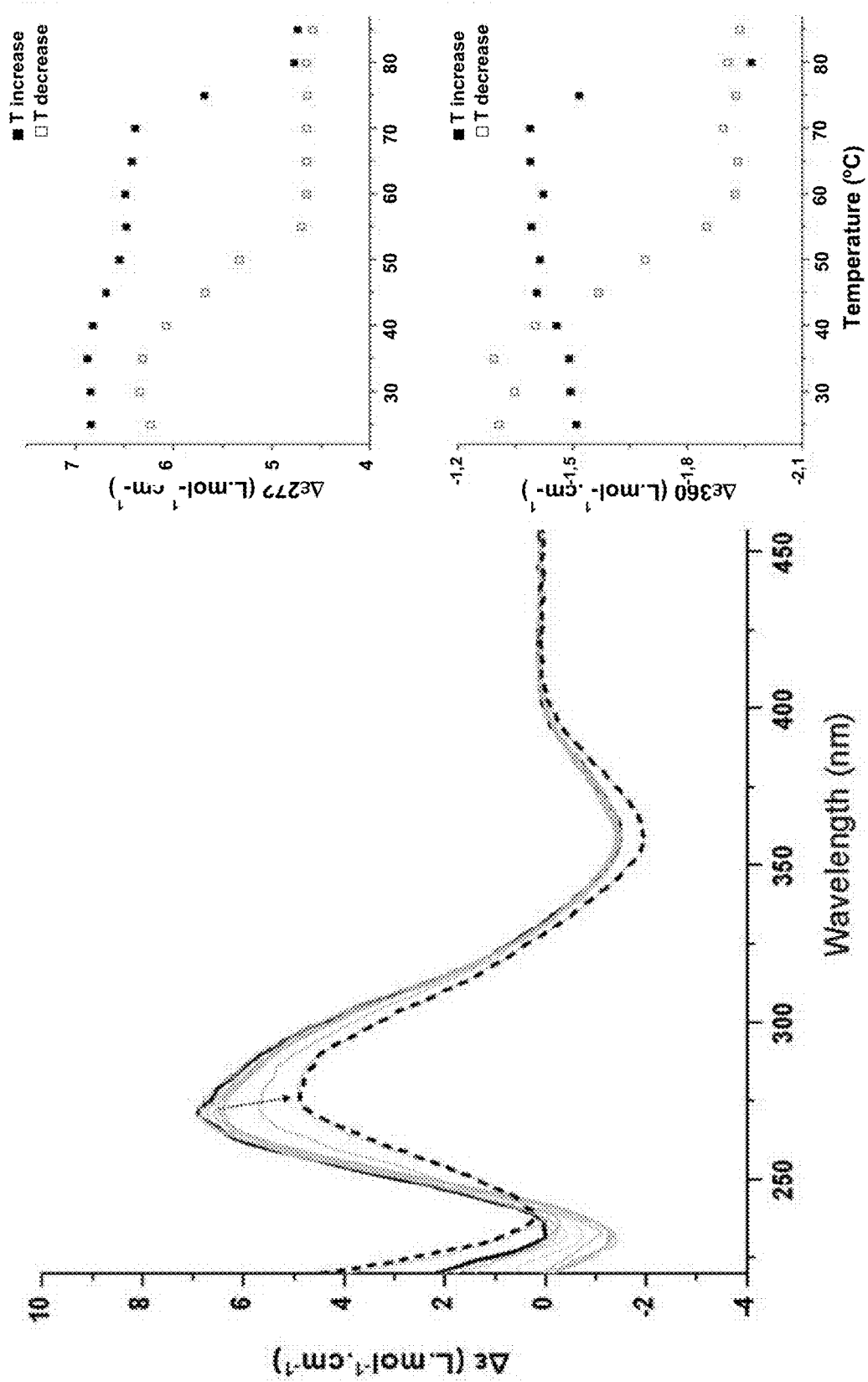
FIG. 7 shows CD spectra of aqueous solutions of poly-1c (1 mg/mL) as a function of the temperature. Left: selected spectral range 25° C. (solid black line); 85° C. (dashed black line). Right: temperature course evolution of CD intensities at 272 (top) and 360 nm (bottom).

Due to the optical transparency of the hydrogels, CD spectra could be measured at an extended range of temperatures. In the case of poly-1c (DP~4400), the intensity of the CD signal slightly decreased above 40° C. and reached a stable value around 50° C. (FIG. 7, $\Delta I_{CD360}$ ~6.4%, $\Delta I_{CD272}$ ~5.6%). Although irreversible, these very limited modifications in the CD spectrum of poly-1c support the idea of a global preservation of the helical polymeric structure within the hydrogel (which is formed above 42° C. for the considered chains). After increasing the temperature to 70° C., a marked change in the CD signal was observed and could be associated to the gel syneresis. This effect was only reversible for samples that were kept for a short period above 80° C. (<10 minutes). Longer annealing periods at 85° C. or higher, resulted in a drastic lowering of the CD intensity after cooling of the medium to room temperature. Similar behaviors were found for derivatives of 1b; the helical structure of the polyisocyanides was preserved in the gel phases up to 70° C.

Figure 8:
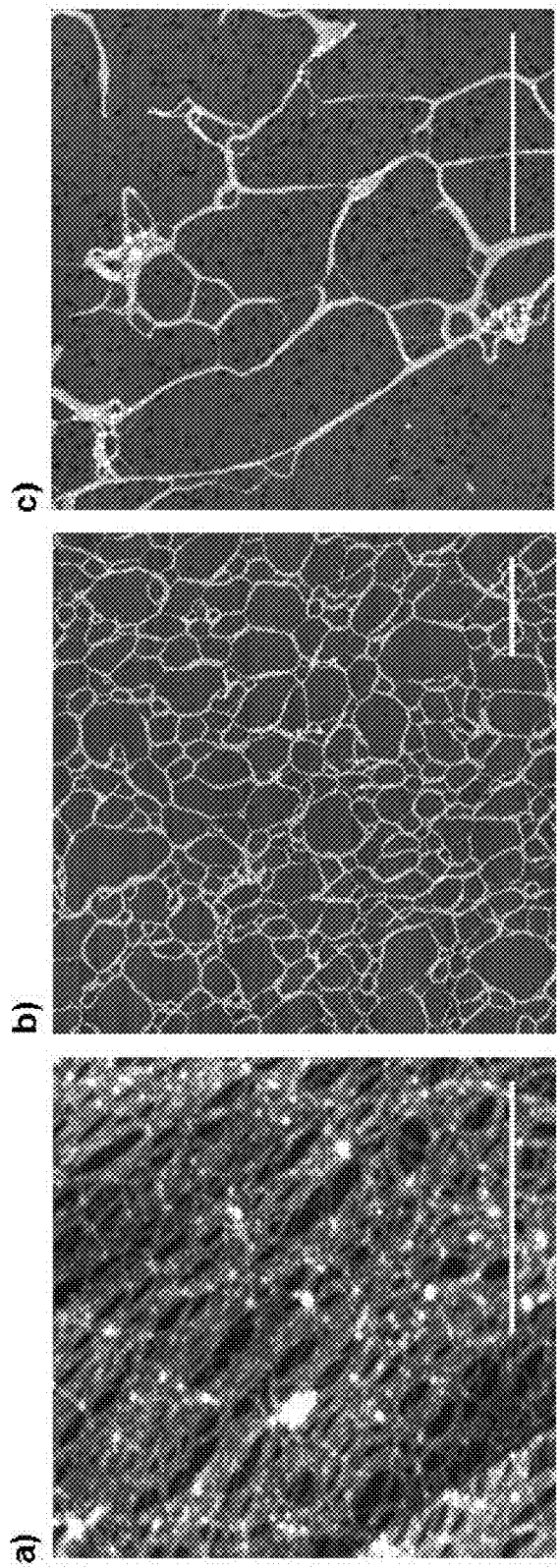
FIG. 8 are AFM pictures of 1 mg/mL poly-1b (DP ~7300) on a) hydrogel coated HOPG or b) mica and c) when the samples were dried in ambient conditions. Scale bars: 1 μm; vertical scale: a) 8 nm, b) and c) 3 nm.

For poly-1b chains with the highest degree of polymerization (DP~7300), the formation of a stable hydrogel at room temperature (22° C.-25° C.) allowed further exploration of its structure by using Transmission Electron Microscopy (TEM) and Atomic Force Microscopy (AFM). As shown in FIG. 8, AFM samples prepared from 1 mg/mL poly-1b hydrogels exhibited an extended fibrillar network at room temperature. Such structures were observed both on Highly Ordered Pyrrolitic Graphite (HOPG) and on mica, indicating their surface-independent nature, and were reminiscent of the features observed in TEM pictures. On HOPG, a thick deposit unambiguously showed a collapsed fibrillar network, which proves the self-standing nature of the fibers (FIG. 8, Panel a). On mica, thinner layers of material could be deposited, which permitted the observation of isolated fibers (FIG. 8, Panels b and c). The lateral dimension of these structures is polydispersed, ranging from a few nm to several tens of nm.

Figure 9:
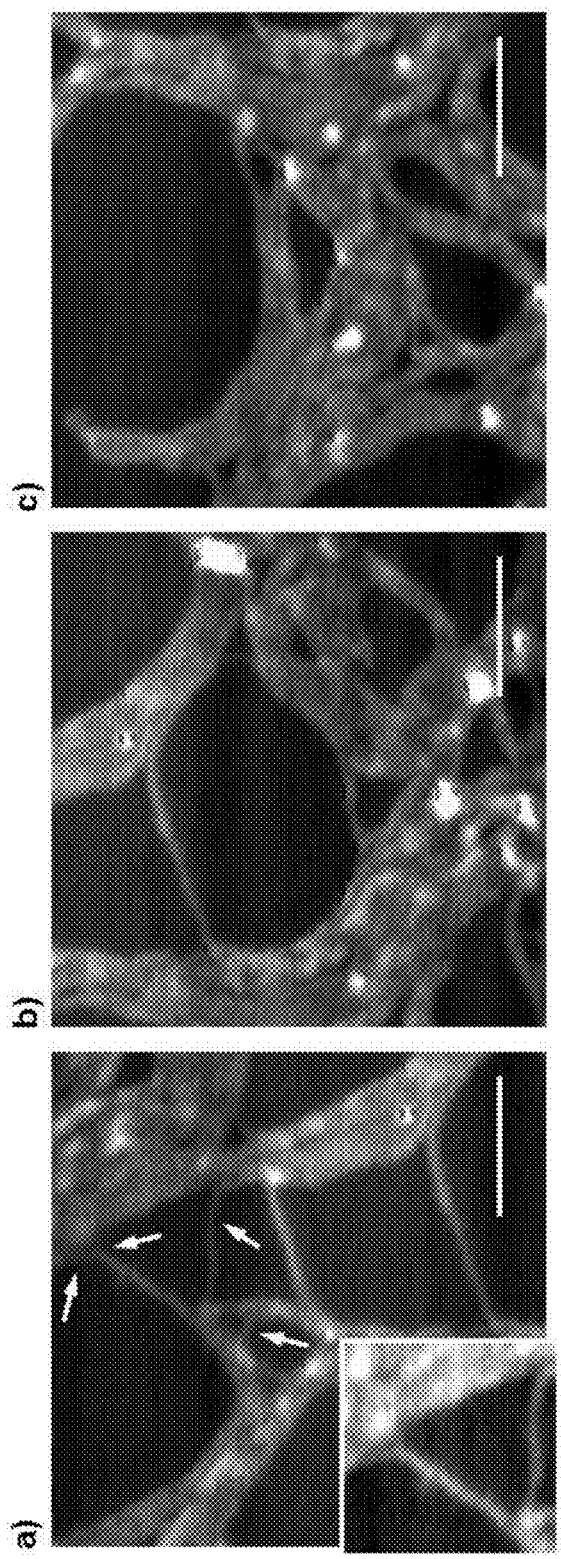
FIG. 9, panels a), b), and c) show details of fibrils and of their association into bundles (gel fibers). Scale bars 100 nm, vertical scale 3 nm. Panels a), b), and c) show different images of the same gel at the same magnification. The white arrows in panel a) indicate single polymer chains. Bottom left inset: selected area of a) with contrast enhancement showing the intertwinement of two poly-1b chains to form a fibril.

As shown in FIG. 9, these fibers resulted from the lateral association and the intertwinement of thinner fibrils, which seemed to be relatively homogeneous in their widths (regardless of the tip broadening effect; the apparent widths of the isolated fibrils are mostly between 20 nm and 25 nm). A closer look at these structures showed that the fibrils themselves resulted from the association of thinner chains, presumably the elemental poly-1b chains (FIG. 9, Panel a).

Figure 10:
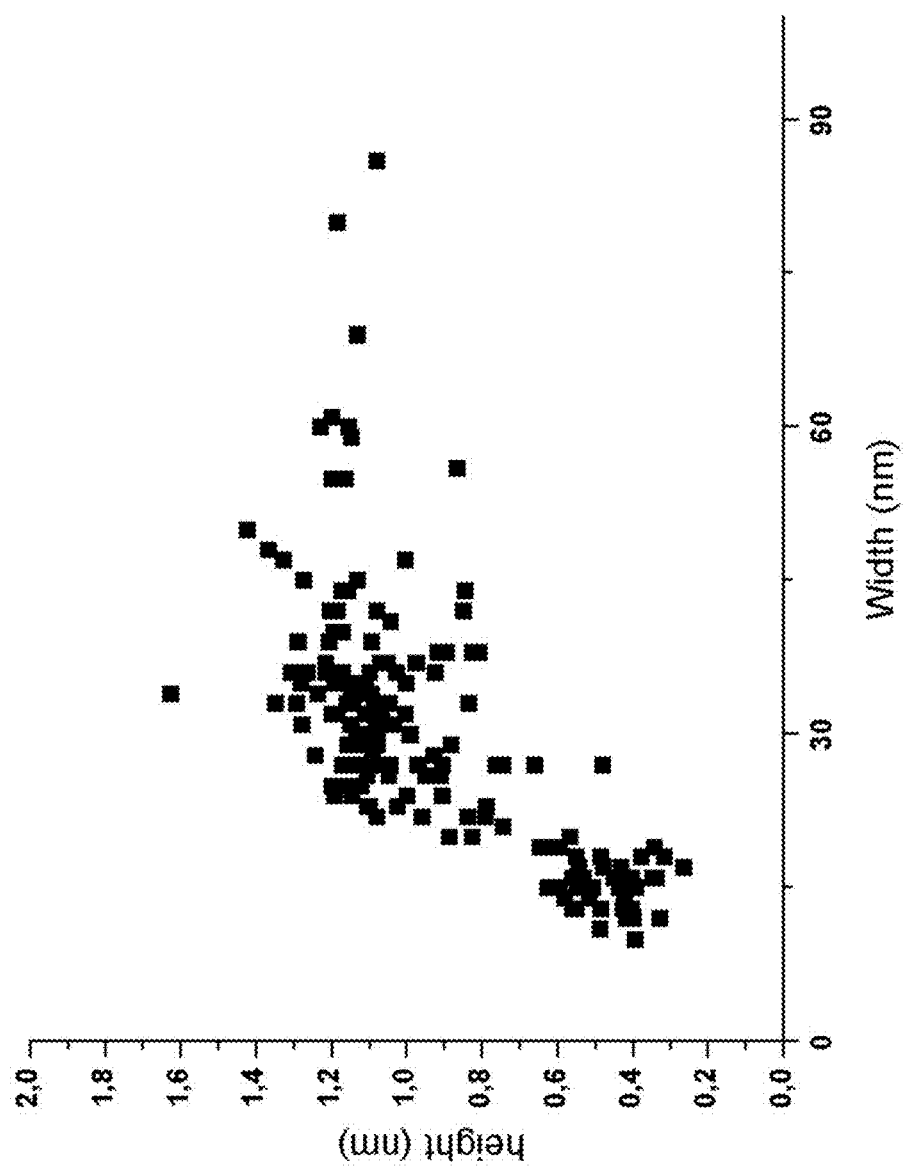
FIG. 10 depict height versus width plot for 172 random sections on AFM micrographs.

When plotting heights versus widths (h,w) of the fibrillar structures observed on mica for 172 random sections, two groups of coordinates can be distinguished on the graph (FIG. 10). The sections were taken from four different pictures, each section was measured perpendicularly to the main axis of the structure considered. The height is defined as the highest point measured in the cross-section (even if it was not the center of the structure cross-section). Random accumulation of matter on certain points was not taken into account for this analysis (white dots in FIGS. 8 (panel c) and 9).

The first is narrowly distributed around the couple (h,w=0.46 nm, 15.51 nm) and presumably corresponds to single poly-1b chain cross-sections (standard deviation: $\delta h$=0.09 nm, $\delta w$=2.92 nm). The lateral tip broadening effect is not corrected; therefore, the widths are exaggerated. In samples prepared by the spin coating of diluted chloroform solutions, isolated chains of poly-1c and poly-1b present similar apparent heights of 0.4 nm to 0.5 nm. The second group of coordinates is more dispersed with apparent heights comprised between 0.8 nm and 1.4 nm and with a rather broad range of width distributions, which corresponds to both the fibrils and the fiber cross-sections. Most of the isolated fibrils exhibit apparent heights comprised between 0.8 nm and 1.1 nm and apparent widths inferior to 30 nm. Interestingly, the apparent height of these isolated fibrils is close to twice the medium apparent height of the supposed single polymer chains (0.46 nm). This suggests that the fibrils result from the close intertwining of at least two poly-1b chains and that these fibrils further aggregate into bundles to form the fibrous gel network. The highest cross-sections (>1.2 nm), which are mainly observed for bundles, may be due to the overlapping of several fibrils on the substrate or to their local intertwinement in the fibers.

Most rigid and rod-like polymers are able to form gels in adequate conditions (liquid crystalline gel phase at high concentration).[34] The low concentration (0.1 wt %) at which poly-1b-c formed hydrogels is, however, remarkable for macromolecules. A few examples of block polymers presenting critical gelation concentration of about 0.1 wt % have been described,[35,36] but generally synthetic homopolymers rarely form physical gels below 1 wt %. In the case of the newly prepared poly-1b-c, the above-described hierarchical assembly of the poly[oligo(ethylene glycol)isocyanide]s explains the formation of strong hydrogels at rather low polymer concentrations. This assembly process is probably related to the secondary structure of the polymer chains and their associated stiffness. It is interesting to note that poly-1c chains with DP~700 precipitate above the transition temperature, whereas chains with higher DP lead to the formation of hydrogels at the same polymer concentration. Therefore, it was assumed that a critical parameter for the formation of the hydrogel at low poly-1b-c concentrations would be the ratio between the polymer DP (i.e., the chain lengths) and the chain stiffness or the related persistence length. It is proposed that the gel network can only be formed if a significant amount of polymer chains reach sizes well above the persistence length of the polymers. This would permit the polymer chains to intertwine and to form elongated micro-fibrils, which further aggregate into bundles that are the base of the gel network. If it is considered as a first approximation that the persistence length of the oligo(ethylene glycol) coated poly(isocyanopeptide) poly-1b-c are similar to the persistence length of the parent poly-(DL)-IAA (76 nm), it is interesting to note that precipitation occurred for chains having a mean length close to that value (81 nm), whereas all the other materials exhibited mean lengths at least three times higher and also formed hydrogels. A more detailed study of the gelation mechanism of the oligo(ethylene glycol)-functionalized polyisocyanopeptides is currently under progress.

Conclusion

A new family of non-linear poly(ethylene glycol) analogs has been prepared based on a polyisocyanopeptide backbone. Using these stiff helical polymers, water-soluble materials could be obtained starting from triethylene glycol side chains. Due to the thermo-sensitive behavior of ethylene glycol side chains, these materials present a clear thermo-induced phase separation. An unexpected effect of the polymer chain length has been shown for these materials; the longest chains were found to be able to gelate water at low polymer concentration (0.1 wt %), the shortest chains simply precipitated in solution, unable to develop extended 3D networks at low polymer concentration. It is proposed that this is a general behavior for long, stiff (or semi-flexible) polymers for which the hydrophilicity can be tuned without modifying the general structure of the chains (i.e., in rigid structures, the chains do not collapse but rather aggregate laterally with other chains to form extended fibers) and might be used to design other low concentration, synthetic macro-gelators. The post-modification of functionalized analogs of these polymers with biomolecules is now being investigated.

EXAMPLES

General

Dichloromethane and chloroform were distilled over $CaCl_2$. Tetrahydrofuran, diethyl ether and toluene were distilled from sodium, in the presence of benzophenone. Water was purified with a MILLIPORE® MILLI-Q® system, (mQ water 18.2 MΩ). All other chemicals were used as received from the suppliers. Column chromatography was performed using silica gel (40 μm to 60 μm) purchased from Merck or silica gel (0.060 mm to 0.200 mm) provided by Baker. TLC analyses were carried out on silica 60 $F_{254}$ coated glass obtained from Merck and the compounds were visualized using Ninhydrine or basic aqueous $KMnO_4$ solutions. $^1$H NMR and $^{13}$C NMR spectra were recorded on a BRUKER® AC-300 MHz instrument operating at 200 or 300 MHz and 75 MHz, respectively. FT-infrared spectra of the pure compounds were recorded on a ThermoMattson IR300 spectrometer equipped with a Harrick ATR unit. Solution IR spectroscopy was carried out in sealed KBr cuvette (1 mm) on a BRUKER® Tensor 27 spectrometer operated with Opus software. Solutions of poly-1a-c and the respective isocyanides 1a-c were prepared in chloroform, tetrahydrofurane, or toluene at a concentration of 30 mM. Melting points were measured on a BÜCHI® B-545 and are reported uncorrected. Mass spectrometry measurements were performed on a JEOL® ACCUTOF® instrument (ESI). Optical rotations were measured on a PERKINELMER® 241 Polarimeter at room temperature and are reported in $10^{-1}$ deg cm$^2$ g$^{-1}$. CD spectra were recorded on a JASCO® 810 instrument equipped with a Peltier temperature control unit. The cell was thermostated at 20° C. or heated/cooled within the desired temperature range at a temperature gradient of 1° C/minute. DLS measurements were carried out on a ZETASIZER® Nano (Malvern Instruments) on non-filtered aqueous solutions (1 mg/mL) in mQ water. All the solutions were degassed (ultrasound bath 3×15 s). The measurement cell was heated/cooled within the desired temperature range at a temperature gradient of 1° C/minute. The polymers were dissolved and AFM experiments were performed using a dimension 3100 or Multimode microscope operated with nanoscope III or nanoscope IV control units (Digital Instruments). Solutions of poly-1a-c (~$10^{-6}$ M in $CHCl_3$) were spin-coated (1600 RPM) onto freshly cleaved Muscovite Mica to determine the contour length (Ln) of isolated polymers chains. Poly-1b hydrogels were deposited by direct contact with freshly cleaved HOPG or muscovite mica. All images were recorded with the AFM operating in TAPPING MODE™ in air at room temperature, with a resolution of 1024×1024 pixels, using moderate scan rates (1-1.5 lines/second). Commercial tapping-mode golden-coated silicon tips (NT-MDT) were used with a typical resonance frequency around 300 kHz. Polymer chain lengths were evaluated using NeuronJ plugin (v1.4.1 by E. Meijering) run on ImmageJ (v1.43I) software (W.S. Rasband, ImageJ, U. S. National Institutes of Health, Bethesda, Md., USA, on the World Wide Web at rsb.info.nih.gov/ij/, 1997-2009).

The polymer chain heights were measured using the Nanoscope software (v6.14r1) from Digital Instruments. TEM micrographs were recorded on a JEOL® JEM-1010 instrument.

Example 1

Materials and Reaction Conditions

Synthesis of
2-methyloxyethyloxyethyl-N-boc-(L)-alaninate (2a)

Unless mentioned, CD spectra were taken from 1 mg/ml samples in freshly distilled dichloromethane or mQ water (18.2 MΩ) on a JASCO® J-810 spectrometer.

The cell was thermostated at 25° C. with the JASCO® peltier module or heated/cooled on the desired range of temperatures with a gradiant rate of 1° C/minute.

NMR spectra were taken on BRUKER® AVANCE® 200 or 300 MHz. When recorded in deuterated chloroform, the chemical shifts were calibrated on TMS signal.

IR spectra were taken on a TENSOR® 27 spectrometer run with Opus (BRUKER® Optics, Marne la Vallee, France), from 1 mg/ml solutions in chloroform.

TAPPING MODE™ AFM measurements were conducted on a Dimension 3100 microscope (Digital Instruments, Santa Barbara, Calif.) controlled with nanoscope IV controller (Digital Instruments, Santa Barbara, Calif.).

The measurements were done on mica samples prepared by spin coating solution of poly 1a-d in chloroform (0.5 mg/ml; 25 μl) on freshly cleaved mica support.

NSG-10 golden coated tips (NT-MDT, Moscov, Russia) were used to take the micrograph.

2-(2-Methoxyethoxy)ethanol (1.28 g, 10.5 mmol), 4-N,/N'-(dimethyl)aminopyridine (128 mg, 1 mmol) and N-Boc-(L)-alanine (2 g, 10.5 mmol) were dissolved in freshly distilled $CH_2Cl_2$ (25 mL). The reaction mixture was cooled to 0° C. (ice bath) and dicyclohexylcarbodiimide (DCC, 2.39 g, 1.1 mmol) was added portionwise. The reaction mixture was stirred for 1 hour at 0° C. and then warmed up to room temperature over 2 hours. The dicyclohexyl urea was filtered off, washed with ethyl acetate (2×20 mL) and the solvents evaporated. Column chromatography ($SiO_2$, 0.060 mm to 0.200 mm/1% MeOH in $CH_2Cl_2$) yielded compound 2a as a colorless to pale yellow oil (2.40 g, 8.3 mmol, 79%).

$^1$H NMR (CDCl$_3$, 300 MHz): 5.14 (br s, 1H, —NH—); 4.32-4.28 (br m, 3H, —CH(CH$_3$)—, —COOCH$_2$—); 3.71 (t, J=4.5 Hz, —COOCH$_2$CH$_2$—); 3.66-3.63 (m, 2H,

—CH$_2$CH$_2$OCH$_3$); 3.56-3.53 (m, 2H, —CH$_2$OCH$_3$); 3.38 (s, 3H, —OCH$_3$); 1.45 (s, 9H, (CH$_3$)$_3$C—); 1.39 (d, J=7.2 Hz, 3H, —CH(CH$_3$)—) $^{13}$C NMR (CDCl$_3$, 75 MHz): 172.8 (—CH(CH$_3$)COO—); 154.5 (—NHCOO—); 79.2 (—OC(CH$_3$)$_3$); 71.4; 70.0 (—COOCH$_2$CH$_2$—); 68.4 (—OCH$_2$CH$_2$O—); 63.7 (—COOCH$_2$CH$_2$—); 58.5 (—OCH$_3$); 48.7 (—CH(CH$_3$)—); 27.8 (—OC(CH$_3$)$_3$); 18.1 (—CH(CH$_3$)—) FT-IR (cm$^{-1}$, ATR): 3352 (br s, N—H); 2977, 2932, 2881, 2825 (C—H); 1742 (C=O ester); 1712 (C=O carbamate); 1518 (N—H carbamate); 1248 (C—O carbamate), 1164 (C—O carbamate, ester); 1109, 1067 (C—O ethers) MS (ESI): m/z ([M +Na]$^+$: C$_{13}$H$_{25}$NO$_6$Na), calcd 291.17; found 291.1 [α]$_D^{20}$: −7.7 (c 0.81; CHCl$_3$).

Example 2

Synthesis of 2-methyloxyethyloxyethyloxyethyloxyethyl-N-boc-(L)-alaninate (2b)

This compound was synthesized according to the same procedure as described in Example 1.

Compound 2b was prepared using the same procedure as described for the synthesis of 2a with the following reactants and solvents: 2-(2-(2-methoxyethoxy)ethoxy)ethanol (1.32 g, 8 mmol), 4-N,N'-(dimethyl)aminopyridine (100 mg, 0.81 mmol), N-Boc-(L)-Alanine (1.51 g, 8 mmol) and DCC (1.67 g, 8.1 mmol) in dichloromethane (25 mL). Column chromatography (SiO$_2$, 0.060 mm to 0.200 mm/1% MeOH in CH$_2$Cl$_2$) yielded compound 2b as a colorless to pale yellow oil (2.35 g, 7.1 mmol, 86%).

$^1$H NMR (CDCl$_3$, 300 MHz): 5.17 (br s, 1H, —NH—); 4.35-4.27 (br m, 3H, —CH(CH$_3$)—, —COOCH$_2$—); 3.71 (t, J=4.5 Hz, 2H, —COOCH$_2$CH$_2$—); 3.67-3.63 (br s, 6H, —OCH$_2$CH$_2$OCH$_2$CH$_2$OCH$_3$); 3.57-3.53 (m, 2H, CH$_2$CH$_2$OCH$_3$); 3.38 (s, 3H, —OCH$_3$); 1.45 (s, 9H, (CH$_3$)$_3$C—); 1.39 (d, J=7.2 Hz, —CH(CH$_3$)—) $^{13}$C NMR (CDCl$_3$, 75 MHz): 172.8 (—CH(CH$_3$)COO—); 154.6 (—NHCOO—); 79.2 (—OC(CH$_3$)$_3$); 71.4; 70.1; 70.0; 68.4; 63.7 (—COOCH$_2$CH$_2$—); 58.5 (—OCH$_3$); 48.7 (—CH(CH$_3$)—); 27.8 (—OC(CH$_3$)$_3$); 18.1 (—CH(CH$_3$)—) FT-IR (cm$^{-1}$, ATR): 3341 (N—H); 2976, 2876 (C—H); 1744 (C=O ester); 1714 (C=O carbamate); 1556 (N—H carbamate); 1249 (C—O carbamate); 1164 (C—O carbamate, ester); 1108, 1068 (C—O ethers) MS (ESI): m/z ([M +Na]$^+$: C$_{15}$H$_{29}$NO$_7$Na), calcd 358.18; found 358.1 [α]$_D^{20}$: −0.97 (c 0.30; CHCl$_3$).

Synthesis of 2-(2-(2-(2-methoxyethoxy)ethoxy)ethoxy)ethyl-N-Boc-(L)-alaninate (2c)

Compound 2c was prepared using the same procedure as described for the synthesis of 2a with the following reactants and solvents: 2-(2-(2-methoxyethoxy)ethoxy)ethanol (4.04 g, 19.4 mmol), 4-N,N'-(dimethyl)aminopyridine (0.27 g, 2,22 mmol), N-Boc-(L)-Alanine (3.66 g, 19.4 mmol) and DCC (4.0 g 19.4 mmol) in dichloromethane (25 mL). Column chromatography (SiO$_2$, 0.060 mm to 0.200 mm/1% MeOH in CH$_2$Cl$_2$) yielded compound 2c as a pale yellow oil (6.88 g, 18.1 mmol, 93%).

$^1$H NMR (CDCl$_3$, 300 MHz): 5.18 (br s, 1H, —NH—); 4.33-4.27 (br m, 3H, —CH(CH$_3$)—, COOCH$_2$—); 3.71 (t, J=4.8 Hz, 2H, —COOCH$_2$CH$_2$—); 3.66-3.63 (m, 10H, —OCH$_2$CH$_2$OCH$_2$CH$_2$OCH$_2$CH$_2$OCH$_3$); 3.56-3.53 (m, 2H, —CH$_2$OCH$_3$); 3.38 (s, 3H, —OCH$_3$); 1.44 (s, 9H, —C(CH$_3$)$_3$); 1.39 (d, J=7.0 Hz, 3H, —CH(CH$_3$)—) $^{13}$C NMR (CDCl$_3$, 75 MHz): 172.8 (—CH(CH$_3$)COO—); 154.6 (—NHCOO—); 79.2 (—OC(CH$_3$)$_3$); 71.4; 70.1; 70.0; 68.4; 63.7 (—COOCH$_2$CH$_2$—); 58.5 (—OCH$_3$); 48.7 (—CH(CH$_3$)—); 27.8 (—OC(CH$_3$)$_3$); 18.1 (—CH(CH$_3$)—) FT-IR (cm$^{-1}$, ATR): 3337 (N—H); 2975, 2935, 2879 (C—H); 1743 (C=O ester); 1712 (C=O carbamate); 1520 (N—H carbamate); 1249 (C—O carbamate); 1165 (C—O carbamate, ester); 1107, 1069 (C—O ethers) MS (ESI): m/z ([M +Na]$^+$: C$_{17}$H$_{33}$NO$_8$Na), calcd 402.21; found 402.1 [α]$_D^{20}$: −5.4 deg (c 1.04; CHCl$_3$).

Example 3

Synthesis of 2-methyloxyethyloxyethyl-(L)-alaninamido-(D)-alaninate (3a)

Compound 2a (2.0 g, 6.8 mmol) was treated with HCl (20 mL, 2 M) in ethyl acetate at room temperature. The deprotection was followed by TLC. When no protected compound remained (~1 hour), the solvent was evaporated under reduced pressure. The crude material was dissolved in tertbutyl alcohol (10 mL), which was subsequently evaporated (two times). The residual tertbutyl alcohol was removed by azeotropic distillation with CH$_2$Cl$_2$ and the crude product was used without further purification for the next coupling reaction.

The deprotected compound, 1-hydroxy-benzotriazole hydrate (HOBt, 1.03 g, 6.9 mmol) and N-Boc-(D)-alanine (1.29 g, 6.8 mmol) were suspended in freshly distilled CH$_2$Cl$_2$ (50 mL). N,N'-diisopropyl-N"-ethylamine (DIPEA, 1.2 mL) was added dropwise and the mixture was stirred at room temperature until almost all the solids were dissolved. The mixture was cooled down to 0° C. (ice bath), and DCC (1.41 g, 6.9 mmol) was added portionwise. The reaction mixture was stirred at 0° C. for 1 hour and then allowed to slowly warm up to room temperature in 3 hours. The dicyclohexyl urea was removed by filtration and washed with ethyl acetate (2×20 ml). The solvent was evaporated and the desired compound was purified via column chromatography (SiO$_2$ 0.060 mm to 0.200 mm/CH$_2$Cl$_2$— 2% MeOH) to yield 3a as a colorless to pale yellow oil (2.01 g, 5.5 mmol, 82%).

$^1$H NMR (CDCl$_3$, 300 MHz): 6.87 (br s, 1H, —CH(CH$_3$)CONH—); 5.24 (br s, 1H, —OCONH—); 4.59 (quint, J=7.2 Hz, 1H, —CH(CH$_3$)COO—); 4.35-4.21 (m, 3H, —CH(CH$_3$)CONH—, —COOCH$_2$—); 3.70 (t, J=4.5 Hz, 2H, —COOCH$_2$CH$_2$—); 3.65-3.63 (m, 2H, —CH$_2$CH$_2$OCH$_3$); 3.56-3.54 (m, 2H, —CH$_2$OCH$_3$); 3.38 (s, 3H, —OCH$_3$); 1.45 (s, 9H, (CH$_3$)$_3$C—); 1.42 (d, J=7.2 Hz, 3H, —CH(CH$_3$)COO—); 1.36 (d, J=6.9 Hz, 3H, —CH(CH$_3$)CONH—) $^{13}$C NMR (CDCl$_3$, 75 MHz): 172.2 (—CH(CH$_3$)COO—); 171.8 (—CH(CH$_3$)CONH—); 155.1 (—NHCOO—); 79.6 (—OC(CH$_3$)$_3$); 71.4; 70.0 (—COOCH$_2$CH$_2$—); 68.4; 63.9 (—COOCH$_2$CH$_2$—); 58.5 (—OCH$_3$); 49.4; 47.6 (—CH(CH$_3$)—); 27.8 (—OC(CH$_3$)$_3$); 17.7 (2×—CH(CH$_3$)—) FT-IR (cm$^{-1}$, ATR): 3317 (br s, N—H); 2977, 2932, 2881, 2828 (C—H); 1739 (C=O ester); 1710 (C=O carbamate); 1664 (amide I); 1512 (N—H carbamate/amide II); 1246 (C—O carbamate), 1199 (C—O ester); 1162 (C—O carbamate, ester); 1129, 1109, 1055 (C—O ethers). MS (ESI): m/z ([M +Na]$^+$; C$_{16}$H$_{30}$N$_2$O$_7$Na), calcd 385.20; found 385.2 [α]$_D^{20}$: +25.4 deg (c 0.81; CHCl$_3$).

Example 4

Synthesis of 2-methyloxyethyloxyethyloxyethyl-(L)-alaninamido-(D)-alaninate (3b)

This compound was synthesized according to the same procedure as described in Example 3.

Compound 3b was prepared using the same procedure as described for the synthesis of 3a with the following reactants and solvents: 2b (2.10 g, 6.3 mmol), HOBt (0.965 g, 6.3 mmol), DCC (1.32 g, 6.4 mmol), N-Boc-(D)-Alanine (1.19 g, 6.3 mmol) and DIPEA (1.29 mL) in dichloromethane (20 mL). Column chromatography (SiO$_2$ 0.060-0.200 mm/CH$_2$Cl$_2$-2% MeOH) yielded 3b as a pale yellow oil (2.0 g, 5.0 mmol, 79%).

$^1$H NMR (CDCl$_3$, 200 MHz): 6.95 (br d, J=6.9 Hz, 1H, —CH(CH$_3$)CONH—); 5.30 (br d, J=6 Hz, 1H, —OCONH—); 4.59 (quint, J=7.4 Hz, 1H, —CH(CH$_3$)COO—); 4.32-4.20 (br m, 3H, —CH(CH$_3$)CONH—, —COOCH$_2$—); 3.71 (t, J=5.0 Hz, 2H, —COOCH$_2$CH$_2$—); 3.67-3.63 (m, 6H, —OCH$_2$CH$_2$OCH$_2$CH$_2$OCH$_3$); 3.58-3.55 (m, 2H, —CH$_2$OCH$_3$);3.38 (s, 3H, —OCH$_3$); 1.45 (s, 9H, (CH$_3$)$_3$C—); 1.42 (d, J=7.2 Hz, 3H, —CH(CH$_3$)COO—); 1.37 (d, J=7.0 Hz, 3H, CH(CH$_3$)CONH—) $^{13}$C NMR (CDCl$_3$, 75 MHz): 172.7 (—CH(CH$_3$)COO—); 172.4 (—CH(CH$_3$)CONH—); 155.5 (—NHCOO—); 80.0 (—OC(CH$_3$)$_3$); 71.9; 70.6; 70.5; 68.8; 64.4 (—COOCH$_2$CH$_2$—); 59.0 (—OCH$_3$); 49.9; 48.0 (—CH(CH$_3$)—); 28.3 (—OC(CH$_3$)$_3$); 18.2 (—CH(CH$_3$)CONH—); 18.2 (—CH(CH$_3$)COO—) FT-IR (cm$^{-1}$, ATR): 3314 (N—H); 2976, 2928, 2876 (C—H); 1739 (C=O ester); 1713 (C=O carbamate); 1667 (amide I); 1517 (N—H carbamate, amide II); 1247 (C—O carbamate); 1199 (C—O ester); (1162 (C—O carbamate, ester); 1104, 1055 (C—O ethers) MS (ESI): m/z ([M+Na]$^+$: C$_{18}$H$_{34}$N$_2$O$_8$Na), calcd 429.22; found 429.2 [α]$_D^{20}$: +18.3 deg (c 1.07; CHCl$_3$).

Example 5

Synthesis of 2-methyloxyethyloxyethyloxyethyloxyethyl-(L)-alaninamido-(D)-alaninate (3c)

This compound was synthesized according to the same procedure as described in Example 3.

Compound 3c was prepared using the same procedure as described for the synthesis of 3a with the following reactants and solvents: 2c (3.03 g, 8.0 mmol), HOBt (1.23 g, 8.1 mmol), DCC (1.67 g, 8.1 mmol), N-Boc-(D)-Alanine 1.53 g, 8.1 mmol) and DIPEA (1.4 mL) in dichloromethane (25 mL). Column chromatography (SiO$_2$ 0.060-0.200 mm/CH$_2$Cl$_2$— 2% MeOH) yielded 3b as a pale yellow oil (2.88 g, 6.4 mmol, 80%).

$^1$H NMR (CDCl$_3$, 300 MHz) : 6.87 (br s, 1H—CH(CH$_3$)CONH—); 5.19 (br s, 1H, —OCONH—); 4.62-4.53 (m, 1H, —CH(CH$_3$)COO—); 4.33-4.20 (br m, 3H, —CH(CH$_3$)CONH—, —COOCH$_2$—); 3.71-3.63 (m, 12H, —COOCH$_2$CH$_2$OCH$_2$CH$_2$OCH$_2$CH$_2$OCH$_3$); 3.56-3.51 (br m, 2H, —CH$_2$OCH$_3$); 3.38 (s, 3H, —OCH$_3$); 1.45 (s, 9H, —C(CH$_3$)$_3$); 1.41 (d, J=7.2 Hz, 3H, —CH(CH$_3$)COO—); 1.35 (d, J=7.0 Hz, 3H, CH(CH$_3$)CONH—) $^{13}$C NMR (CDCl$_3$, 75 MHz): 172.2 (—CH(CH$_3$)COO—); 171.8 (—CH(CH$_3$)CONH—); 155.0 (—NHCOO—); 79.6 —OC(CH$_3$)$_3$); 71.4; 70.1; 70.0; 68.4; 63.9 (—COOCH$_2$CH$_2$—); 58.5 (—OCH$_3$); 49.5; 47.6 (—CH(CH$_3$)—); 27.8 (—OC(CH$_3$)$_3$); 17.7 (2x—CH(CH$_3$)—) FT-IR (cm$^{-1}$, ATR): 3319 (N—H); 2976, 2931, 2879 (C—H); 1740 (C=O ester); 1711 (C=O carbamate); 1665 (amide I); 1513 (N—H carbamate, amide II); 1248 (C—O carbamate); 1200 (C—O ester); 1163 (C—O carbamate, ester); 1105, 1067 (C—O ethers) MS (ESI): m/z ([M +Na]$^+$: C$_{20}$H$_{38}$N$_2$O$_9$Na), calcd 473.25; found 473.2 [α]$_D^{20}$: +17.4 (c 0.81; CHCl$_3$).

Example 6

Synthesis of 2-methyloxyethyloxyethyl-(L)-alaninamido-(D)-formalaninate (4a)

Compound 3a (1.26 g, 3.5 mmol) was treated with HCl (15 mL, 2 M) in ethyl acetate at room temperature. The deprotection was followed by TLC. When no protected compound remained (~1 hour) the solvent was evaporated under reduced pressure. The crude material was dissolved in tertbutyl alcohol (10 mL), which was subsequently evaporated (two times). The residual tertbutyl alcohol was removed via azeotropic distillation with CH$_2$Cl$_2$ and the crude product was used without further purification.

The deprotected compound was dissolved in ethyl formate (50 ml), sodium formate (1.89 g, 27.8 mmol) was added and the mixture was refluxed for 4 hours under argon. After cooling down to room temperature, the mixture was filtered off to remove the sodium formate, and the solvent was evaporated under reduced pressure. Column chromatography (SiO$_2$ 0.060 mm to 0.200 mm/CH$_2$Cl$_2$— 4% MeOH) yielded 4a as a white solid (0.89 g, 3.1 mmol, 86%).

$^1$H NMR (CDCl$_3$, 300 MHz): 8.18 (s, 1H, —CHO); 6.98 (br d, J=7.5 Hz, —CH(CH$_3$)CONH—); 6.87 (br d, J=6 Hz, 1H, —NHCHO); 4.69-4.45 (m, 2H, —CH(CH3)CONH—, —CH(CH$_3$)COO—); 4.36-4.20 (m, 2H, —COOCH$_2$—); 3.69-3.67 (m, 2H, —COOCH$_2$CH$_2$—); 3.63-3.61 (m, 2H, —CH$_2$CH$_2$OCH$_3$); 3.57-3.55 (m, 2H, —CH$_2$OCH$_3$); 3.38 (s, 3H, —OCH$_3$); 1.43 (d, J=7.2 Hz, 3H, —CH(CH$_3$)COO—); 1.39 (d, J=7.0 Hz, 3H, CH(COH$_3$)CONH—) $^{13}$C NMR (CDCl$_3$, 75 MHz): 172.1 (—CH(CH$_3$)COO—); 171.0 (—CH(CH$_3$)CONH—); 160.9 (—NHCHO; 71.4; 69.9 (—COOCH$_2$CH$_2$—); 68.5; 63.8 (—COOCH$_2$CH$_2$—); 58.4 (—OCH$_3$); 47.7; 46.6 (—CH(CH$_3$)—); 17.3 (—CH(CH$_3$)CONH—); 17.1 (—CH(CH$_3$)COO—) FT-IR (cm$^{-1}$, ATR): 3287 (N—H); 2980, 2941, 2881, 2816 (C—H); 1740 (C=O ester); 1653 (amide I, formamide I); 1524 (amide II, formamide II); 1200 (C—O ester); 1160 (C—O ester); 1135, 1105, 1058 (C—O ethers) MS (ESI): m/z ([M +Na]$^+$: C$_{12}$H$_{22}$N$_2$O$_6$Na), calcd 313.14; found 313.3 [α]$_D^{20}$: +52.7 (c 1.4; CHCl$_3$).

Example 7

Synthesis of 2-methyloxyethyloxyethyloxyethyl-(L)-alaninamido-(D)-formalaninate (4b)

Compound 4b was prepared using the same procedure as described for the synthesis of 4a with the following reactants: 3b (0.85 g, 2.1 mmol), sodium formate (1.14 g, 16.8 mmol), ethyl formate (30 mL). Column chromatography (SiO$_2$ 0.060-0.200 mm/CH$_2$Cl$_2$— 4% MeOH) yielded 4b as a pale yellow oil (0.63 g, 1.8 mmol, 89%).

$^1$H NMR (CDCl$_3$, 200 MHz): 8.18 (s, 1H, —CHO); 7.36 (br d, J=7.4 Hz, 1H, —CH(CH$_3$)CONH—); 7.15 (br d, J=7.5 Hz, 1H, —NHCHO); 4.70-4.52 (m, 2H, —CH(CH3)CONH—, —CH(CH$_3$)COO—); 4.35-4.19 (m, 2H, —COOCH$_2$—); 3.73-3.60 (m, 8H, —COOCH$_2$CH$_2$OCH$_2$CH$_2$OCH$_2$CH$_2$OCH$_3$); 3.58-3.53 (m, 2H, —CH$_2$OCH$_3$); 3.38 (s, 3H, —OCH$_3$); 1.42 (d, J=7.4 Hz, 3H, —CH(CH$_3$)COO—); 1.40 (d, J=7.2 Hz, 3H, CH(CH$_3$)CONH—) $^{13}$C NMR (CDCl$_3$, 75 MHz): 172.6 (—CH(CH$_3$)COO—); 171.7 (—CH(CH$_3$)CONH—); 161.5 (—NHCHO); 71.8; 70.6; 70.5; 70.4; 68.9; 64.4 (—COOCH$_2$CH$_2$—); 58.9 (—OCH$_3$); 48.3; 47.2 (—CH(CH$_3$)—); 18.00 (—CH(CH$_3$)CONH—); 17.8 (—CH(CH$_3$)COO—) FT-IR (cm$^{-1}$, ATR): 3284 (N—H); 3059, 2981, 2876 (C—H); 1739 (C=O ester); 1654 (amide I, formamide I); 1525 (amide II, formamide II); 1201 (C—O ester); 1160 (C—O ester); 1135, 1099 (C—O ethers) MS (ESI): m/z ([M+Na]$^+$: C$_{14}$H$_{26}$N$_2$O$_7$Na), calcd 357.17; found 357.3 [α]$_D^{20}$: +46.0 deg (c 0.81; CHCl$_3$).

Example 8

Synthesis of 2-methyloxyethyloxyethyloxyethyloxyethyl-(L)-alaninamido-(D)-formalaninate (4c)

Compound 4c was prepared using the same procedure as described for the synthesis of 4a with the following reactants: 3c (2.0 g, 4.4 mmol), sodium formate (2.40 g, 35.2 mmol), ethyl formate (50 mL). Column chromatography (SiO₂ 0.060 mm to 0.200 mm/CH₂Cl₂— 4% MeOH) yielded 4c as a pale yellow oil (1.41 g, 3.7 mmol, 85%).

¹H NMR (CDCl₃, 300 MHz): 8.18 (s, 1H, —C$\underline{H}$O); 7.20 (d, J=7.5 Hz, 1H, —CH(CH₃)CON$\underline{H}$—); 7.02 (d, J=7.8 Hz, 1H, —N$\underline{H}$CHO); 4.70-4.62 (m, 1H, —C$\underline{H}$(CH₃)COO—); 4.57-4.50 (m, 1H, —C$\underline{H}$(CH₃)CONH—); 4.35-4.19 (m, 2H, —COOC$\underline{H}_2$—); 3.70-3.62 (m, 12H, —C$\underline{H}_2$OCH₂C$\underline{H}_2$OC$\underline{H}_2$C$\underline{H}_2$OCH₂C$\underline{H}_2$OCH₂CH₂OCH₃); 3.56-3.35 (m, 2H, —C$\underline{H}_2$OCH₃); 3.38 (s, 3H, —OC$\underline{H}_3$); 1.42 (d, J=7.2 Hz, 3H, —CH(C$\underline{H}_3$)COO—); 1.40 (d, J=7.5 Hz, 3H, CH(C$\underline{H}_3$)CONH—) ¹³C NMR (CDCl₃, 75 MHz): 172.1 (—$\underline{C}$H(CH₃)COO—); 171.1 (—CH($\underline{C}$H₃)CONH—); 161.0; 71.4; 70.1; 70.0; 69.9; 68.4; 63.9 (—COO$\underline{C}$H₂CH₂—); 58.4 (—O$\underline{C}$H₃); 47.8; 46.7 (—$\underline{C}$H(CH₃)—); 17.4 (—CH($\underline{C}$H₃)CONH—); 17.3 (—CH($\underline{C}$H₃)CONH—) FT-IR (cm⁻¹, ATR): 3300 (N—H); 2982, 2875 (C—H); 1738 (C=O ester); 1658 (amide I, formamide I); 1530 (Amide II, formamide II); 1202 (C—O ester); 1165 (C—O ester); 1098 (C—O ethers) MS (ESI): m/z ([M+Na]⁺: C₁₆H₃₀N₂O₈Na), calcd 401.19; found 401.3 [α]$_D^{20}$: +42.4 (c 0.95; CHCl₃).

Example 9

Synthesis of 2-methyloxyethyloxyethyl-(L)alaninamido-(D)-isocyanylalanine (1a)

Formamide 3a (300 mg, 1.03 mmol) and N-methylmorpholine (570 μL, 524 mg, 5.15 mmol) were dissolved in freshly distilled CH₂Cl₂ (50 mL) and cooled down to −30° C. (dry ice-acetone bath). A solution of diphosgene (334 μL, 205 mg, 1.03 mmol) in freshly distilled CH₂Cl₂ (5 mL) was added dropwise to the solution over 5 minutes. After stirring the reaction mixture at −30° C. for another 10 minutes (during which the mixture turned yellow), the reaction was quenched by addition of solid sodium bicarbonate (3 g). The suspension was vigorously stirred at −30° C. for 10 minutes and then warmed up to room temperature. The crude mixture was poured on a silica short plug (silica 0.060 mm to 0.200 mm/CH₂Cl₂) without further work up, and the desired compound eluted with CH₂Cl₂— 25% acetonitrile to lead to the compound 1a as a white solid that was recrystallized from EtOH/diisopropylether (190 mg, 0.70 mmol, 68%).

¹H NMR (CDCl₃, 300 MHz): 6.96 (br s, 1H, —N$\underline{H}$—); 4.59 (q, J=7.2 Hz, 1H, —C$\underline{H}$(CH₃)COO—); 4.34 (br t, J=4.5 Hz, 2H, —COOC$\underline{H}_2$—); 4.27 (q, J=6.9 Hz, —C$\underline{H}$(CH₃)CONH—); 3.73 (br t, J=4.5 Hz, 2H, —COOCH₂C$\underline{H}_2$—); 3.67-3.63 (m, 2H, —C$\underline{H}_2$CH₂OCH₃); 3.56-3.51 (m, 2H, —C$\underline{H}_2$OCH₃); 3.39 (s, 3H, —OCA; 1.66 (d, J=6.6 Hz, 3H, C≡NCH(C$\underline{H}_3$)—); 1.49 (d, J=7.2 Hz, 3H, —CH(C$\underline{H}_3$)COO—) ¹³C NMR (CDCl₃, 75 MHz): 171.5 (—$\underline{C}$H(CH₃)COO—); 165.2 (—CH(CH₃)$\underline{C}$ONH—); 161.0 (—N$\underline{C}$); 76.8; 71.4; 70.1; 68.4; 64.2 (—COO$\underline{C}$H₂CH₂—); 58.6 (—O$\underline{C}$H₃); 52.9; 49.1 (—$\underline{C}$H(CH₃)—); 19.2 (—CH($\underline{C}$H₃)CONH—); 17.6 (—CH($\underline{C}$H₃)CONH—) FT-IR (cm⁻¹, ATR): 3313 (N—H); 2887, 2880 (C—H); 2140 (N≡C isocyanide); 1740 (C=O ester); 1678 (C=O, amide I); 1537 (N—H, amide II); 1200 (C—O, ester); 1106, 1024 (C—O ethers) HRMS (ESI): m/z ([M +Na]⁺: C₁₂H₂₀N₂O₅Na), calcd 295.12617; found 295.12699 [α]$_D^{20}$: −2 (c 0.29; CH₂Cl₂) mp: 53° C.

Example 10

Synthesis of 2-methyloxyethyloxyethyloxyethyl-(L)alaninamido-(D)-isocyanylalanine (1b)

Compound 1b was prepared using the same procedure as described for the synthesis of 1a with the following reactants: 4b (1.5 g, 4.49 mmol), N-methylmorpholine (1.23 mL, 1.13 g, 11.1 mmol), diphosgene (461 μL, 755 mg, 3.83 mmol) in dichloromethane (200 mL+10 mL). Column chromatography (SiO₂ 0.060 mm to 0.200 mm/CH₂Cl₂- 25% acetonitrile) yielded 1b as a pale yellow gel (1.15 g, 3.65 mmol, 81%).

¹H NMR (CDCl₃, 300 MHz): 7.06 (br s, 1H, —N$\underline{H}$—); 4.60 (quint, J=7.2 Hz, 1H, —C$\underline{H}$(CH₃)COO—); 4.35-4.26 (br m, 3H, —COOC$\underline{H}_2$—, —C$\underline{H}$(CH₃)CONH—); 3.72 (t, J=4.5 Hz, 2H, —COOC$\underline{H}_2$C$\underline{H}_2$); 3.66 (br s, 6H, —OCH₂C$\underline{H}_2$OC$\underline{H}_2$CH₂OCH₃); 3.59-3.54 (m, 2H, —C$\underline{H}_2$OCH₃); 3.38 (s, 3H, —OC$\underline{H}_3$); 1.66 (d, J=6.6 Hz, 3H, CH(C$\underline{H}_3$)CONH—); 1.47 (d, J=6.9 Hz, 3H, —CH(C$\underline{H}_3$)COO—) ¹³C NMR (CDCl₃, 75 MHz): 171.5 (—CH(CH₃)$\underline{C}$OO—); 165.3 (—CH(CH₃)$\underline{C}$ONH—); 160.8 (—N$\underline{C}$); 78.8; 71.4; 70.2; 70.1; 70.0; 68.5; 64.2 (—COO$\underline{C}$H₂CH₂—); 58.5 (—O$\underline{C}$H₃); 52.8; 48.0 (—$\underline{C}$H(CH₃)—); 19.2 (—CH($\underline{C}$H₃)CONH—); 17.6 (—CH($\underline{C}$H₃)CONH—) FT-IR (cm⁻¹, ATR): 3312 (N—H); 2885, 2878 (C—H); 2140 (N≡C isocyanide); 1740 (C=O ester); 1681 (C=O, amide I); 1536 (N—H, amide II); 1200 (C—O, ester); 1099, 1025 (C—O ethers) HRMS (ESI): m/z ([M +Na]⁺: C₁₄H₂₄N₂O₆Na), calc 339.15285; found 339.15321 [α]$_D^{20}$: 10 deg (c 0.70; CH₂Cl₂).

Example 11

Synthesis of 2-methyloxyethyloxyethyloxyethyloxyethyl-(L)alaninamido-(D)-isocyanylalanine (1c)

Compound 1c was prepared using the same procedure as described for the synthesis of 1a with the following reactants: 4c (526 mg, 1.39 mmol), N-methylmorpholine (384 μL, 354 mg, 3.5 mmol), diphosgene (143 μL, 235 mg, 1.19 mmol) in dichloromethane (200 mL+10 mL). Column chromatography (SiO₂ 0.060 mm to 0.200 mm/CH₂Cl₂— 25% acetonitrile) yielded 1c as a pale yellow viscous oil (402 mg, 1.11 mmol, 80%).

¹H NMR (CDCl₃, 300 MHz): 7.00 (d, J=6.3 Hz, 1H, —CH(CH₃)CON$\underline{H}$—); 4.62-4.52 (m, 1H, —C$\underline{H}$(CH₃)COO—); 4.32-4.21 (m, 3H, —COOC$\underline{H}_2$—, —C$\underline{H}$(CH₃)CONH—); 3.70 (t, J=4.8 Hz, 2H, —COOCH₂C$\underline{H}_2$); 3.63-3.61 (m, 10H, —C$\underline{H}_2$C$\underline{H}_2$OC$\underline{H}_2$C$\underline{H}_2$OC$\underline{H}_2$C$\underline{H}_2$OC$\underline{H}_3$); 3.54-3.51 (m, 2H, —C$\underline{H}_2$OCH₃); 3.36 (s, 3H, —OC$\underline{H}_3$); 1.63 (d, J=6.9 Hz, 3H, CH(C$\underline{H}_3$)CONH—); 1.46 (d, J=7.2 Hz, 3H, —CH(C$\underline{H}_3$)COO—) ¹³C NMR (CDCl₃, 75 MHz) : 171.5 (—CH(CH₃)$\underline{C}$OO—); 165.4 (—CH(CH₃)$\underline{C}$ONH—); 160.5 (—N$\underline{C}$); 78.1; 71.4; 70.1; 70.0; 68.3; 64.2 (—COO$\underline{C}$H₂CH₂—); 58.5 (—O$\underline{C}$H₃); 52.9; 52.8; 48.1 (—$\underline{C}$H(CH₃)—); 19.2 (—CH($\underline{C}$H₃)CONH—); 17.5 (—CH($\underline{C}$H₃)CONH—) FT-IR (cm⁻¹, ATR): 3313 (N—H); 2880, 2875 (C—H); 2140 (N≡C isocyanide); 1740 (C=O ester); 1680 (C=O amide I); 1531 (N—H amide II); 1201 (C—O ester); 1103, 1026 (C—O ethers) HRMS (ESI): m/z ([M +Na]⁺: C₁₆H₂₈N₂O₆Na), calc 383.17889; found 383.17942 [α]$_D^{20}$: −5 deg (c 0.51; CH₂Cl₂).

Example 12

Synthesis of poly(2-methyoxywthyloxyethyloxyethloxy-(L)-alaninamido-(D)-aisocyanylalanine)

To a solution of monomer (40 mg, 15 mmol) in freshly distilled toluene (3 mL) was added a solution of Ni(ClO4)2·H2O (0.147 mol/L, 10 μL) in toluene-30% methanol. The reaction mixture was vigorously stirred under air in a sealed flask, for two hours. The solvent was evaporated and the crude polymer redissolved in CHCl13 (3 mL). It was precipitated against diethyl ether (10 mL) and collected by centrifugation (3500 rpm, 7 min). The pale yellow precipitate was redissolved in CHC13 (3 mL) and precipitated against diethyl ether (10 mL) and collected by centrifugation two other times before being dried under vacuum to yield polymer (29.2 mg, 10.9 mmol, 73%) as a yellow-brown glassy solid.

$^1$H NMR (CDCl3, 300 MHz): 3.74-3.36 (br m, 13H); 1.60 (br s, 6H); FT-IR (cm$^{-1}$, ATR): 3263 (N—H); 2927, 2880 (C—H); 1740 (C=O); 1656 (C=O amide I); 1531 (N—H amide II); 1214 (C—O ester); 1108 (C—O ethers) [α]D20: +75 (c 0.03; CH2Cl2) Mn: 478 KDa Mw: 716 KDa.

Compound 1b (40 mg, XX) was dissolved in freshly distilled toluene (2 ml) and a solution of Ni(ClO$_4$)$_2$·H$_2$O previously dissolved in a mixture of toluene and methanol (2-1) was added. The reaction mixture was stirred vigorously for 4 hours. The viscous solution was diluted with tetrahydrofurane (4 ml) and precipitated against diethyl ether (15 ml). The precipitate was collected via centrifugation (6 minutes, 4000 rpm) and the supernatant discarded. The gel like material was redissolved with tetrahydrofuran (6 ml) and precipitated against diethylether (15 ml). The cycle was repeated three times to yield a colorless to pale yellow glassy solid.

Example 13

Polymerization of Compound 1c

Compound 1c was polymerized following the same procedure as compound 1b.

Example 14

Co-polymerization of Compounds 1b and 1c

A mixture of both compounds 1b and 1c was treated with Ni9ClO4)2 following the same procedure as for compound 1b.

Example 15

Co-polymerization of Compounds 1c and 1d

The copolymerization of 1c and 1d was conducted following the same procedure as in Example 14.

Example 16

Influence of the Solvent Used in the Polymerization Process

The same monomers were used as in the examples described above.

Example 17

Synthesis of Polymer poly-1a

To a solution of 1a (40 mg, 15 mmol) in freshly distilled toluene (3 mL) was added a solution of Ni(ClO$_4$)$_2$·H$_2$O (0.147 mol/L, 10 μL) in toluene-30% methanol. The reaction mixture was vigorously stirred under air in a sealed flask for two hours. The solvent was evaporated and the crude polymer redissolved in CHCl$_3$ (3 mL). It was precipitated against diethyl ether (10 mL) and collected by centrifugation (3500 rpm, 7 minutes). The pale yellow precipitate was redissolved in CHCl$_3$ (3 mL) and precipitated against diethyl ether (10 mL) and collected by centrifugation two other times before being dried under vacuum to yield poly-1a (29.2 mg, 10.9 mmol, 73%) as a yellow-brown glassy solid.

$^1$H NMR (CDCl$_3$, 300 MHz): 3.74-3.36 (br m, 13H); 1.60 (br s, 6H); FT-IR (cm$^{-1}$, ATR): 3263 (N—H); 2927, 2880 (C—H); 1740 (C=O); 1656 (C=O amide I); 1531 (N—H amide II); 1214 (C—O ester); 1108 (C—O ethers) [α]$_D^{20}$: +75 (c 0.03; CH$_2$Cl$_2$) Mn: 478 KDa Mw: 716 KDa.

Synthesis of Polymer poly-1b

Poly-1b was prepared using the same procedure as described for poly-1a, except that tetrahydrofuran was used to redissolve the polymer during the purification. The following reactants were used: 1b (40 mg, 12.6 mmol), Ni(ClO$_4$)$_2$.H$_2$O solution (0.126 mol/L, 10 μL), in toluene (2 mL). Purification of the crude mixture yielded poly-1b (33.7 mmol, 10.7 mmol, 85%) as a deep yellow glassy solid.

$^1$H NMR (CDCl$_3$, 300 MHz): 3.68-3.34 (b rm, 17H); 1.58 (br s, 6H); FT-IR (cm$^{-1}$, ATR): 3260 (N—H); 2917, 2875 (C—H); 1740 (C=O); 1657 (C=O amide I); 1530 (N—H amide II); 1210 (C—O ester); 1105 (C—O ethers) [α]$_D^{20}$: +105 (c 0.03; CH$_2$Cl$_2$) Mn: 830 KDa Mw: 1327 KDa.

1b (41 mg, 12.9 mmol), Ni(ClO$_4$)$_2$.H$_2$O solution (1.29 mmol/L, 10 μL), in toluene (2 mL). Purification of the crude mixture yielded poly-1b (32.0 mmol, 10.1 mmol, 78%) as a pale yellow glassy solid.

$^1$H NMR (CDCl$_3$, 300 MHz): 3.68-3.34 (br m, 17H); 1.58 (br s, 6H); FT-IR (cm$^{-1}$, ATR): 3260 (N—H); 2917, 2875 (C—H); 1740 (C=O); 1657 (C=O amide I); 1530 (N—H amide II); 1210 (C—O ester); 1105 (C—O ethers) Mn: 2306 KDa Mw: 3458 KDa.

Synthesis of Polymer poly-1c

Poly-1c was prepared using the same procedure as described for poly-1b. The following reactants were used: 1c

|  | [Ni(ClO$_4$)$_2$•H$_2$O] (mol %) | | | | | | | | |
|---|---|---|---|---|---|---|---|---|---|
|  | 1[a] | | | 0.1[a] | | | 0.01[b] | | |
|  | yield (%) | Mw[c] (Da) | PDI[c] | yield (%) | Mw[c] (Da) | PDI[c] | yield (%) | Mw[c] (Da) | PDI[c] |
| toluene | 90 | 505000 | 3.01 | 88 | nd[d] | nd[d] | 78 | nd[d] | nd[d] |
| tetrahydrofuran | 83 | 554000 | 2.79 | 38 | 652000 | 2.30 | 0.4 | nd[e] | nd[e] |
| dichloromethane | 57 | 145000 | 1.88 | 28 | 144000 | 1.86 | 5 | 122000 | 1.88 |
| methanol | 51 | 248000 | 2.75 | 4 | 72000 | 1.42 | 0 | — | — | reaction conditions:

[a]isocyanide 20 mg/ml, catalyst dissolved in methanol-toluene 1-2 mixtures, 4 hours, RT
[b]isocyanide 20 mg/ml, catalyst dissolved in methanol-toluene 1-2 mixtures, 12 hours, RT
[c]Results obtained by analytical gel permeation chromatography, ReproGel column (300 × 8 mm, 5 μm, linear, Dr Maisch Gmbh, Ammerbuch-Entrigen, Germany) run at 35° C. with THF-0.25% tetrabutyl ammonium bromide. Calibration used: poly (ethylene glycol) standards.
[d]not determined: substantial fraction to all polymer above the column resolution limit (2,000,000 Da).
[e]not determined: to low material quantity collected to run a proper analysis.

(50.1 mg, 13.8 mmol), Ni(ClO$_4$)$_2$.H$_2$O solution (0.138 mol/L, 10 μL), in toluene (2.5 mL). Purification of the crude mixture yielded poly-1c (45.2 mg, 12.5 mmol, 90%) as a deep yellow glassy solid.

$^1$H NMR (CDCl$_3$, 300 MHz): 3.71-3.35 (br m, 21H); 1.63 (br s, 6H); FT-IR (cm$^{-1}$, ATR): 3261 (N—H); 2917, 2879 (C—H); 1740 (C=O); 1656 (C=O amide I); 1529 (N—H amide II); 1213 (C—O ester); 1109 (C—O ethers) [α]$_D^{20}$: +175 (c 0.01; CH$_2$Cl$_2$); [α]$_D^{20}$: +169 (c 0.03; H$_2$O) Mn: 249 KDa Mw: 323 KDa.

1c (56.3 mg, 15.6 mmol), Ni(ClO$_4$)$_2$.H$_2$O solution (1.56 mmol/L, 10 μL), in toluene (2.8 mL). Purification of the crude mixture yielded poly-1b (43.9 mmol, 12.2 mmol, 78%) as a pale yellow glassy solid.

$^1$H NMR (CDCl$_3$, 300 MHz): 3.71-3.35 (brm, 14H); 1.63 (brs, 6H); FT-IR (cm$^{-1}$, ATR): 3260 (N—H); 2917, 2875 (C—H); 1740 (C=O); 1657 (C=O amide I); 1530 (N—H amide II); 1210 (C—O ester); 1105 (C—O ethers) Mn: 1589 KDa Mw: 2702 KDa.

REFERENCES (1) Lutz J. F., *J. Polym. Sci. Pol. Chem.* 2008, 46:3459-3470.
(2) Neugebauer D., Polym. Int. 2007, 56:1469-1498.
(3) Aoshima S., H. Oda, and E. Kobayashi, *J. Polym. Sci. Pol. Chem.* 1992, 30:2407-2413.
(4) Aoshima S. and E. Kobayashi, Huthig & Wepf Verlag, 1995, p. 91-102.
(5) Hua F. J., X. G. Jiang, D. J. Li, and B. Zhao, *J. Polym. Sci. Pol. Chem.* 2006, 44:2454-2467.
(6) Wang X. S. and S. P. Armes, *Macromolecules* 2000, 33:6640-6647.
(7) Ishizone T., S. Han, S. Okuyama, and S. Nakahama, *Macromolecules* 2003, 36:42-49.
(8) Han S., M. Hagiwara, and T. Ishizone, *Macromolecules* 2003, 36:8312-8319.
(9) Oh J. K., K. Min, and K. Matyjaszewski, *Macromolecules* 2006, 39:3161-3167.
(10) Yamamoto S., J. Pietrasik, and K. Matyjaszewski, *Macromolecules* 2007, 40:9348-9353.
(11) Zhao B., D. J. Li, F. J. Hua, and D.R. Green, *Macromolecules* 2005, 38:9509-9517.
(12) Hase Y., Y. Mitsutsuji, M. Ishikawa, K. Maeda, K. Okoshi, and E. Yashima, *Chem.-Asian J.* 1 2007, 2:755-763.
(13) Kitto H. J.; E. Schwartz, M. Nijemeisland, M. Koepf, J. Cornelissen, A. E. Rowan, and R. J. M. Nolte, *J. Mater. Chem.* 2008, 18:5615-5624.
(14) Roks M. F. M. and R. J. M. Nolte, *Macromolecules* 1992, 25:5398-5407.
(15) Millich F., *Macromolecular Reviews Part D-Journal of Polymer Science* 1980, 15:207-253.
(16) Nolte R. J. M., *Chem. Soc. Rev.* 1994, 23:11-19.
(17) Suginome M. and Y. Ito, In *Polymer Synthesis*; Springer-Verlag Berlin: Berlin, 2004, Vol. 171, p. 77-136.
(18) *Foldamers: Structure, Properties, and Applications*; M. B. J. Otten, G. A. Metselaar, J. J. L. M. Cornelissen, A. E. Rowan, R. J. M. Nolte, Ed., Wiley: Weinheim, 2007.
(19) Kumaki J., S. Sakurai, and E. Yashima, *Chem. Soc. Rev.* 2009, 38:737-746.
(20) Cornelissen J., J. Donners, R. de Gelder, W. S. Graswinckel, G. A. Metselaar, A. E. Rowan, N. Sommerdijk, and R. J. M. Nolte, *Science* 2001, 293:676-680.
(21) Okoshi K., K. Nagai, T. Kajitani, S.I. Sakurai, and E. Yashima, *Macromolecules* 2008, 41:7752-7754.
(22) de Witte P. A. J., M. Castriciano, J. Cornelissen, L. M. Scolaro, R. J. M. Nolte, and A. E. Rowan, *Chem.-Eur. J.* 2003, 9:1775-1781.
(23) Hernando J., P. A. J. de Witte, E. van Dijk, J. Korterik, R. J. M. Nolte, A. E. Rowan, M. F. Garcia-Parajo, and N. F. van Hulst, *Angew Chem. Int. Edit.* 2004, 43:4045-4049.
(24) Finlayson C. E., R. H. Friend, M. B. J. Otten, E. Schwartz, J. Cornelissen, R. L. M. Nolte, A. E. Rowan, P. Samori, V. Palermo, A. Liscio, K. Peneva, K. Mullen, S. Trapani, and D. Beljonne, *Adv. Funct. Mater.* 2008, 18:3947-3955.
(25) Schwartz E., V. Palermo, C. E. Finlayson, Y. S. Huang, M. B. J. Otten, A. Liscio, S. Trapani, I. Gonzalez-Valls, P. Brocorens, J. Cornelissen, K. Peneva, K. Mullen, F. C. Spano, A. Yartsev, S. Westenhoff, R. H. Friend, D. Beljonne, R. J. M. Nolte, P. Samori, and A. E. Rowan, *Chem.-Eur.* 1 2009, 15:2536-2547.
(26) Lutz J. F. and A. Hoth, *Macromolecules* 2006, 39:893-896.
(27) Millich F., *Chem. Rev.* 1972, 72:101.
(28) Metselaar G. A., J. Cornelissen, A. E. Rowan, and R. J. M. Nolte, *Angew Chem. Int. Edit.* 2005, 44:1990-1993.
(29) Nolte R. J. M. and W. Drenth, *Redl. Tray. Chim. Pays.-Bas.* 1973, 92:788-800.
(30) Kajitani T., K. Okoshi, S. I. Sakurai, J. Kumaki, and E. Yashima, *J. Am. Chem. Soc.* 2006, 128:708-709.
(31) Kajitani T., K. Okoshi, and E. Yashima, *Macromolecules* 2008, 41:1601-1611.
(32) Wezenberg S. J., G. A. Metselaar, A. E. Rowan, J. Cornelissen, D. Seebach, and R. J. M. Nolte, *Chem.-Eur. J.* 2006, 12:2778-2786.
(33) Schwartz E., H. J. Kitto, R. de Gelder, R. J. M. Nolte, A. E. Rowan, and J. Cornelissen, *J. Mater. Chem.* 2007, 17:1876-1884.
(34) *Thermoreversible Gelation of Polymers and Biopolymers*, J. M. Guenet, Ed., Accademic Press: New York, 1992.
(35) Nowak A. P., V. Breedveld, L. Pakstis, B. Ozbas, D. J. Pine, D. Pochan, and T. J. Deming, *Nature* 2002, 417:424-428.
(36) Breedveld V., A. P. Nowak, J. Sato, T. J. Deming, and D. J. Pine, *Macromolecules* 2004, 37:3943-3953.

What is claimed is:

1. A poly(oligo(alkylene glycol))isocyanopeptide comprising repeating units of an isocyano di-, tri-, or tetra peptidic motif substituted at its C terminal via an ester linkage to an oligo(alkylene glycol) chain having from 1 to 10 alkylene glycol repeating units, with the proviso that the poly(oligo(alkylene glycol))isocyanopeptide does not comprise a triazole moiety.

2. The poly(oligo(alkylene glycol))isocyanopeptide of claim 1, wherein the peptidic motif is a dipeptide.

3. The poly(oligo(alkylene glycol))isocyanopeptide of claim 1, wherein the oligo(alkylene glycol) is oligo(ethylene glycol).

4. A poly(oligo(alkylene glycol))isocyanopeptide comprising repeating units of an isocyano di-, tri-, or tetrapeptide motif substituted at its C terminal via an ester linkage to an oligo(alkylene glycol) chain having from one (1) to ten (10) alkylene glycol repeating units, wherein the poly(oligo(alkylene glycol))isocyanopeptide satisfies the formula

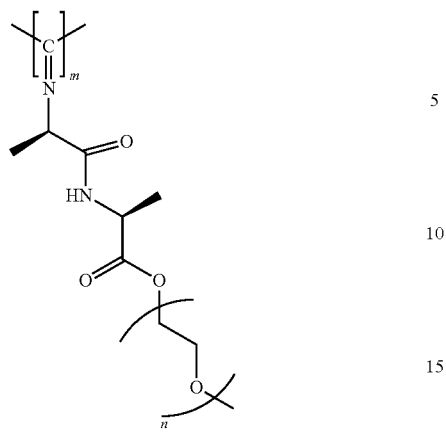

wherein n is an integer of from 1 to 4 and m is an integer of up to 100,000.

5. A hydrogel comprising the poly(oligo(alkylene glycol)) isocyanopeptide of claim 1.

6. A hydrogel comprising the poly(oligo(alkylene glycol)) isocyanopeptide of claim 4.

7. A coating comprising the poly(oligo(alkylene glycol)) isocyanopeptide of claim 1.

8. A coating comprising poly(oligo(alkylene glycol))isocyanopeptide of claim 4.

\* \* \* \* \*